US012416185B2

(12) United States Patent
Guma et al.

(10) Patent No.: US 12,416,185 B2
(45) Date of Patent: *Sep. 16, 2025

(54) MULTIFUNCTION HUB CORE FOR MORTISE LOCK AND METHOD OF ASSEMBLY

(71) Applicant: ASSA ABLOY Access and Egress Hardware Group, Inc., New Haven, CT (US)

(72) Inventors: Jarrett Guma, Newington, CT (US); Eric Palmieri, Rocky Hill, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 738 days.

This patent is subject to a terminal disclaimer.

(21) Appl. No.: 17/488,037

(22) Filed: Sep. 28, 2021

(65) Prior Publication Data

US 2022/0018161 A1 Jan. 20, 2022

Related U.S. Application Data

(63) Continuation of application No. 15/787,872, filed on Oct. 19, 2017, now Pat. No. 11,156,021.

(Continued)

(51) Int. Cl.

*E05B 63/00* (2006.01)
*E05B 9/02* (2006.01)

(Continued)

(52) U.S. Cl.

CPC ............ *E05B 63/0065* (2013.01); *E05B 9/02* (2013.01); *E05B 59/00* (2013.01); *E05B 63/08* (2013.01)

(58) Field of Classification Search

CPC ........ E05B 63/0065; E05B 9/02; E05B 59/00; E05B 63/08; E05B 63/16; E05B 13/005;

(Continued)

(56) References Cited

U.S. PATENT DOCUMENTS 1,611,940 A * 12/1926 Ohmer ................. G07B 13/005 251/297
2,426,141 A * 8/1947 Kell .................... E05B 63/0017 70/129

(Continued)

FOREIGN PATENT DOCUMENTS

GB 2 471 656 A 1/2011

OTHER PUBLICATIONS

International Search Report and Written Opinion in International Application No. PCT/US2017/057578, mailed Jan. 26, 2018.

(Continued)

*Primary Examiner* — Christine M Mills
*Assistant Examiner* — Faria F Ahmad
(74) *Attorney, Agent, or Firm* — Wolf, Greenfield & Sacks, P.C.

(57) ABSTRACT

A multifunction hub core for a mortise lock comprises a mortise lock body having a deadbolt operable by a first control member on the outside of a door and a second control member on the inside of the door, and a deadbolt arm with slots for receiving a hub core. The deadbolt arm is rotatable inside the mortise lock body to move the deadbolt between retracted and projected positions. The hub core disposed in the deadbolt arm comprises projections allowing it to fit in the deadbolt arm slots in one of two positions. The first position allows the second control member to move the deadbolt between retracted and projected positions and is known as the standard function. The second position allows the second control member to retract the deadbolt from a (Continued)

projected position, but cannot project the deadbolt from a retracted position, and is known as the classroom function.

25 Claims, 32 Drawing Sheets

Related U.S. Application Data

(60) Provisional application No. 62/411,098, filed on Oct. 21, 2016.

(51) Int. Cl.
*E05B 59/00* (2006.01)
*E05B 63/08* (2006.01)

(58) Field of Classification Search
CPC ........... E05B 15/004; E05B 2063/0082; Y10T 292/1097; Y10T 70/5805; Y10T 70/5416; Y10T 70/5496
See application file for complete search history.

(56) References Cited

U.S. PATENT DOCUMENTS

| | | | | | |
|---|---|---|---|---|---|
| 3,672,714 | A | | 6/1972 | Schultz | |
| 4,047,408 | A | | 9/1977 | Johns et al. | |
| 4,313,320 | A | | 2/1982 | Best et al. | |
| 5,040,652 | A | * | 8/1991 | Fish | E05C 1/163 70/472 |
| 5,113,675 | A | * | 5/1992 | Uyeda | E05B 13/10 70/279.1 |
| 6,581,423 | B2 | * | 6/2003 | Lin | E05B 55/06 70/486 |
| 6,598,909 | B2 | * | 7/2003 | Lu | E05B 47/0012 292/144 |
| 7,188,870 | B2 | | 3/2007 | Huang | |
| 8,234,892 | B2 | | 8/2012 | Laverty et al. | |
| 10,626,634 | B2 | * | 4/2020 | Verderaime | E05B 1/0007 |
| 10,890,019 | B2 | * | 1/2021 | Lien | E05B 63/14 |
| 11,156,021 | B2 | * | 10/2021 | Guma | E05B 63/0065 |
| 11,834,863 | B2 | * | 12/2023 | Lin | E05B 59/00 |
| 2002/0139156 | A1 | * | 10/2002 | Aramburu | E05B 47/0692 70/218 |
| 2003/0019256 | A1 | * | 1/2003 | Frolov | E05B 47/0688 70/222 |
| 2016/0017638 | A1 | * | 1/2016 | Dore Vasudevan | E05B 55/12 292/137 |
| 2017/0275920 | A1 | * | 9/2017 | Chen | E05B 17/22 |
| 2018/0112438 | A1 | | 4/2018 | Guma et al. | |

OTHER PUBLICATIONS

International Preliminary Report on Patentability in International Application No. PCT/US2017/057578, mailed May 2, 2019.

* cited by examiner

MULTIFUNCTION HUB CORE FOR MORTISE LOCK AND METHOD OF ASSEMBLY

CROSS-REFERENCE TO RELATED APPLICATIONS

This application is a continuation of U.S. application Ser. No. 15/787,872, filed Oct. 19, 2017, which claims priority to U.S. Application Ser. No. 62/411,098, filed Oct. 21, 2016. The entire contents of these applications are incorporated herein by reference in their entirety.

BACKGROUND OF THE INVENTION

1. Field of the Invention

The present invention is related to mortise locks, and in particular to a hub core for a deadbolt mechanism with the ability to change between standard and classroom functions based on assembly orientation.

2. Description of Related Art

Conventional mortise locks employ both a latchbolt and a deadbolt. Both can be configured for different functions. A deadbolt operates by rotation of a deadbolt arm which mates securely around a hub core, which hub core is typically rotatable by a thumbturn or throw lever on the inside of the door, and a lock cylinder on the outside of the door. A "standard" function of a deadbolt is to permit the deadbolt to be operated in both directions, i.e., projected or extended to lock and retracted to unlock, by rotation of either the thumbturn inside the door or the lock cylinder (via a key) outside the door. Rotation of the thumbturn or key in one direction rotates the hub core and deadbolt arm and will cause the deadbolt to retract. Rotation of the thumbturn or key in the opposite direction rotates the hub core and deadbolt arm and will cause the deadbolt to project.

In a "classroom" function, a key in the lock cylinder outside the door will operate both to project and retract the deadbolt. However, using the thumbturn will only cause the deadbolt arm to retract, while rotation in the opposite direction will not permit the deadbolt to project.

Currently the only way to switch between standard and classroom functions is to swap between two completely different hub cores that mate in different configurations with the deadbolt arm.

SUMMARY OF THE INVENTION

Bearing in mind the problems and deficiencies of the prior art, it is therefore an object of the present invention to provide an improved hub core for a mortise lock.

It is another object of the present invention to provide a single hub core that may be used to set deadbolt operation in a mortise lock for both standard and classroom operation functions.

A further object of the invention is to provide a deadbolt arm hub core that may be alternately switched between two different orientations during assembly of the mortise lock to provide either a standard or a classroom function for operation of the deadbolt.

Still other objects and advantages of the invention will in part be obvious and will in part be apparent from the specification.

The above and other objects, which will be apparent to those skilled in the art, are achieved in the present invention which is directed to a mortise lock for locking and unlocking a door. The mortise lock comprises a mortise lock body, a deadbolt arm, and a hub core. The mortise lock body has a deadbolt operable by a first control member on the outside of the door and a second control member on the inside of the door. The deadbolt is selectably moveable between a projected position to lock the door and a retracted position to unlock the door. The deadbolt arm in the mortise lock body is rotatable to move the deadbolt between the projected and retracted positions. The hub core is disposed in the deadbolt arm and is operable by the second control member, the hub core being positionable in the deadbolt arm in two different positions. In a first position, the hub core is operable by the second control member to move the deadbolt between the projected and retracted positions. In a second position, the hub core is operable by the second control member to move the deadbolt from the projected position to the retracted position, the hub core not being operable by the second control member to move the deadbolt from the retracted position to the projected position.

In an embodiment, the mortise lock first control member may be operable to move the deadbolt between the projected and retracted positions while in either of the first or second positions. The hub core may have a plurality of projections with arc lengths that fit into a plurality of slots with arc lengths in an opening in the deadbolt arm, wherein in the first position the hub core causes movement of the deadbolt in a standard function and in the second position the hub core causes movement of the deadbolt in a classroom function. The arc lengths of the hub core projections and deadbolt arm slots may be configured to permit the deadbolt arm to rotate and move the deadbolt in both the standard and classroom functions. The arc lengths of the hub core projections and deadbolt arm slots may also allow for a loss motion connection between the hub core and deadbolt arm slots when the hub core is in the second position. The hub core may also have a pair of projections with arc lengths that fit into a pair of slots with arc lengths in an opening in the deadbolt arm, wherein one hub core projection may fit rotationally tightly into one slot in the deadbolt arm opening when the hub core is in the first position in the deadbolt arm, and wherein both hub core projections fit rotationally loosely into both slots in the deadbolt arm opening when the hub core is in the second position in the deadbolt arm. The hub core may also have a first projection having an arc length of about 90° and a second projection having an arc length of about 45°, the deadbolt arm having an opening with a first slot having an arc length of about 90° and a second slot having an arc length of 135°, wherein in the first hub core position the first projection is disposed in the first slot and the second projection is disposed in the second slot, and in the second hub core position the first projection is disposed in the second slot and the second projection is disposed in the first slot. The hub core projections may have different thicknesses in an axial direction, with the thickness of the first projection being less than the thickness of the second projection.

The present invention further provides a method of assembling a mortise lock for locking and unlocking a door. The method provides a mortise lock body, a deadbolt arm, and a hub core. The mortise lock body has a deadbolt operable by a first control member on the outside of the door and a second control member on the inside of the door. The deadbolt is selectably moveable between a projected position to lock the door and a retracted position to unlock the door. The deadbolt arm in the mortise lock body is rotatable to move the deadbolt between the projected and retracted positions. The hub core is operable by the second control member, the hub core being positionable in the deadbolt arm in two different positions. In a first position, the hub core is operable by the second control member to move the deadbolt between the projected and retracted positions. In a second position, the hub core is operable by the second control member to move the deadbolt from the projected position to the retracted position, the hub core not being operable by the second control member to move the deadbolt from the retracted position to the projected position.

In an embodiment of the method, the first control member is operable to move the deadbolt between the projected and retracted positions while in either of the first or second positions. The hub core may have a plurality of projections with arc lengths that fit into a plurality of slots with arc lengths in an opening in the deadbolt arm, wherein in the first position the hub core causes movement of the deadbolt in a standard function and in the second position the hub core causes movement of the deadbolt in a classroom function. The arc lengths of the hub core projections and deadbolt arm slots may be configured to permit the deadbolt arm to rotate and move the deadbolt in both the standard and classroom functions. The arc lengths of the hub core projections and deadbolt arm slots may also allow for a loss motion connection between the hub core and deadbolt arm slots when the hub core is in the second position. The hub core may also have a pair of projections with arc lengths that fit into a pair of slots with arc lengths in an opening in the deadbolt arm, wherein one hub core projection may fit rotationally tightly into one slot in the deadbolt arm opening when the hub core is in the first position in the deadbolt arm, and wherein both hub core projections fit rotationally loosely into both slots in the deadbolt arm opening when the hub core is in the second position in the deadbolt arm. The hub core may also have a first projection having an arc length of about 90° and a second projection having an arc length of about 45°, the deadbolt arm having an opening with a first slot having an arc length of about 90° and a second slot having an arc length of 135°, wherein in the first hub core position the first projection is disposed in the first slot and the second projection is disposed in the second slot, and in the second hub core position the first projection is disposed in the second slot and the second projection is disposed in the first slot. The hub core projections may have different thicknesses in an axial direction, with the thickness of the first projection being less than the thickness of the second projection.

The present invention may still further provide a method of changing function of operation of a deadbolt in a mortise lock. The method provides a mortise lock body having a deadbolt operable by a first control member on the outside of the door and a second control member on the inside of the door. The deadbolt is selectably moveable between a projected position to lock the door and a retracted position to unlock the door. the mortise lock has a deadbolt arm rotatable to move the deadbolt between the projected and retracted positions, and a hub core disposed in the deadbolt arm that is operable by the second control member. The hub core is positionable in the deadbolt arm in one of a first or second position. In a first position, the hub core is operable by the second control member to move the deadbolt between the projected and retracted positions. In a second position, the hub core is operable by the second control member to move the deadbolt from the projected position to the retracted position, the hub core not being operable by the second control member to move the deadbolt from the retracted position to the projected position. The method includes removing the hub core from the deadbolt arm, then reinserting the hub core into the deadbolt arm in the other of the first and second position to change operation of the hub core by the second control member.

In an embodiment, the method further includes the mortise lock body comprising sidewalls, and removing one sidewall from the mortise lock body prior to removing the hub core from the deadbolt arm. The method may also include the hub core and deadbolt arm being rotatable about an axis, and rotating the hub core after removing the hub core from the deadbolt arm prior to reinserting the hub core into the deadbolt arm. More specifically, the hub core may be rotated 180° after removal from the deadbolt arm and prior to reinsertion into the deadbolt arm.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment(s) of the present invention, reference will be made herein to FIGS. 1-35 of the drawings in which like numerals refer to like features of the invention. The invention may be utilized in both auxiliary and full mortise locks to configure them for either standard or classroom function operation of the deadbolt.

Figure 1:
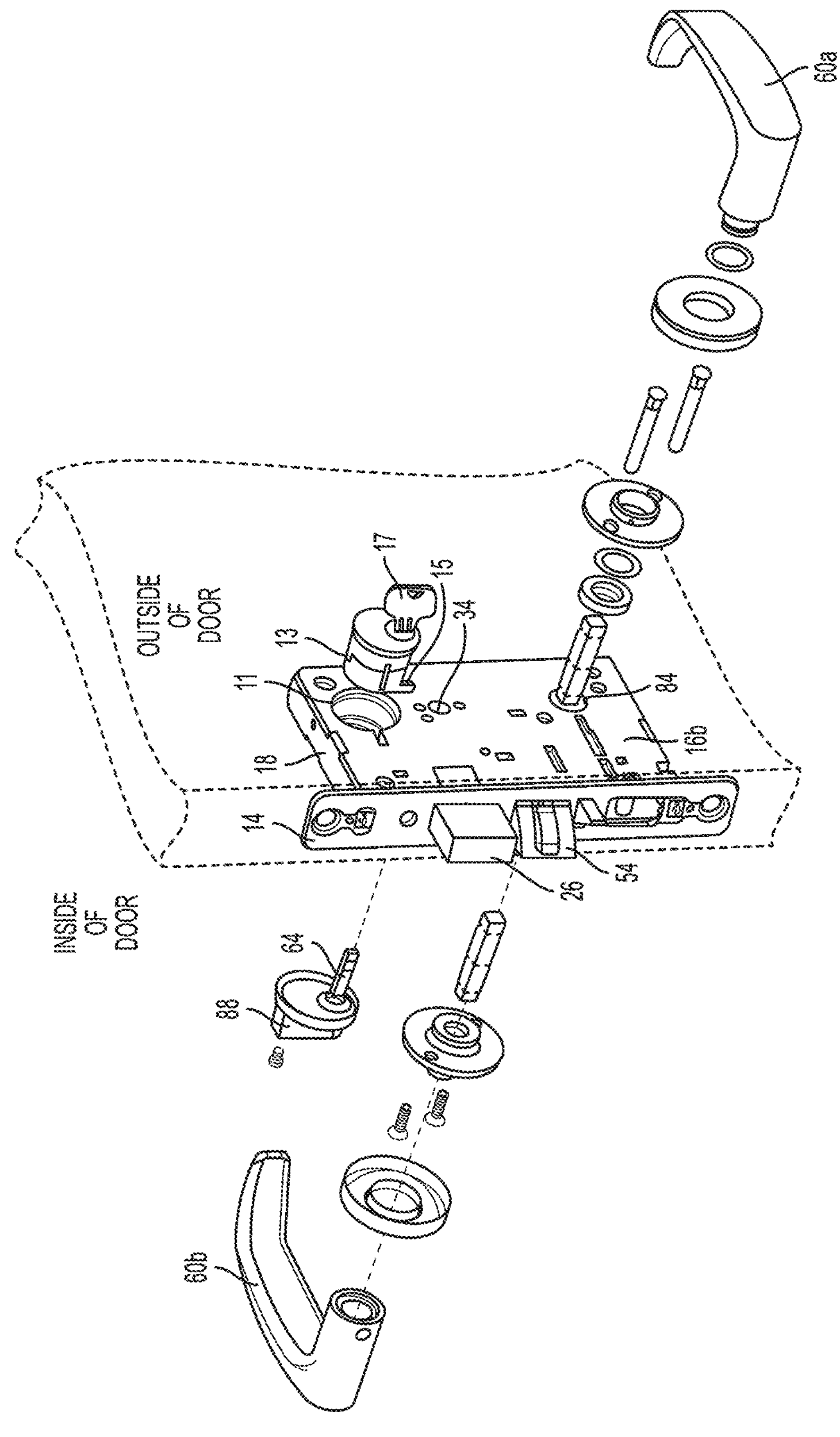
FIG. 1 is a perspective, partially exploded view of a mortise lock incorporating the hub core and the deadbolt arm of the present invention, switchable between standard and classroom functions.
Figure 2:
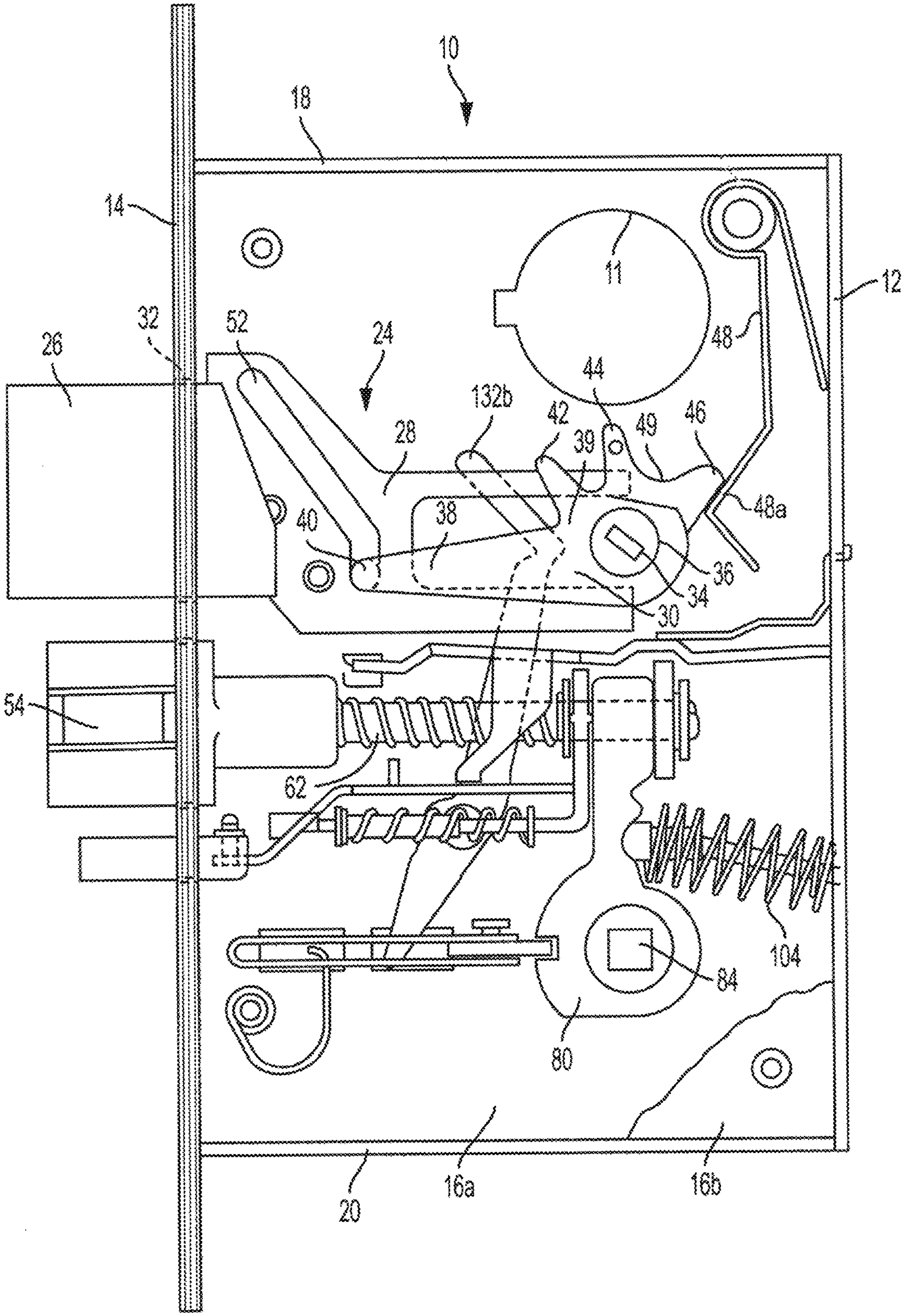
FIG. 2 is a side elevational view, with the side panel removed, of the mortise lock of FIG. 1.

In FIGS. 1 and 2 there is shown a full mortise-type lockset 10 incorporating the switchable-function hub core and the deadbolt arm of the present invention. Mortise lock 10 has casing 12, including top and bottom walls 18, 20 and sidewalls 16*a*, 16*b*. Mortise lock 10 fits within a mortise opening in the door, and includes on the outside a lock cylinder 13 and on the inside a thumbturn 88 which operates deadbolt 26. Mortise lock 10 has an outer lever handle 60*a*, and an inner lever handle 60*b*, which are connected via shafts to square opening 84 in spindle hub 80. Rotation of spindle hub 80 moves latchbolt rod 62 and causes latchbolt 54 to retract and withdraw into casing 12. Latchbolt 54 and rod 67 are normally held in the extended position by spring 104. The operation of latchbolt 54 by handles 60*a*, 60*b* is conventional, and discussion below will be directed to assembly, construction and operation of the deadbolt and associated deadbolt arm and hub core of the present invention, which utilizes a different configuration and different assembly options compared to the prior art.

The lock cylinder 13 extends through an opening in the door and lock cylinder opening 11 in mortise lock sidewall 16*a*. The lock cylinder 13 acts as a control member to operate deadbolt 26 in the manner of the prior art. Rotation of key 17 turns the cylinder plug in lock cylinder 13 which operates a tail cam or arm 15 that engages fingers of a deadbolt arm within the mortise lock 10. Rotation of the key 17 in one direction causes the deadbolt 76 to be extended and locks the mortise lock 10. Rotation in the opposite direction retracts deadbolt 26 and unlocks the mortise lock mechanism.

On the inside of the door, thumbturn throw lever 88 operates as a control member to rotate and turn thumbturn blade shaft 64 which extends into a slot 34 in a hub core 36 controlling rotation and operation of the deadbolt arm. When the deadbolt thumbturn on the inside is turned in one direction, it retracts deadbolt 26. When turned in the opposite direction, the thumbturn 88 may or may not extend the deadbolt 26, depending on whether the lock is set to the standard or classroom function.

Referring to FIG. 2, lock 10 incorporates a deadbolt operation mechanism, which includes deadbolt 26, deadbolt bracket 28 and deadbolt arm 30. Deadbolt 26 is movable within opening 32 in front plate 14 and between a locked position and an unlocked position. When deadbolt 26 is in the locked position (FIGS. 2 and 3), deadbolt 26 projects from casing 12 through opening 32 in front plate 14. When deadbolt 26 is in the unlocked position (FIG. 4), deadbolt 26 is substantially completely withdrawn into casing 12.

Figure 4:
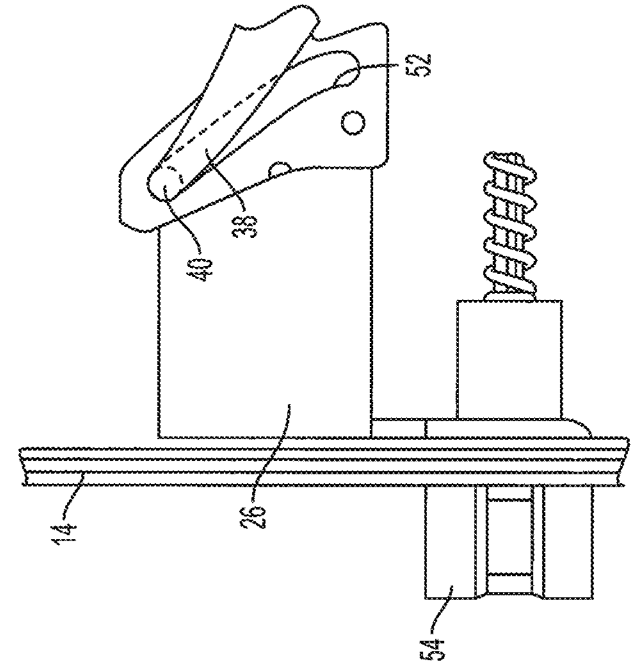
FIG. 4 is a side elevational view of a portion of the mortise lock of FIG. 1 showing the deadbolt arm and deadbolt in the retracted position, to unlock the door.
Figure 3:
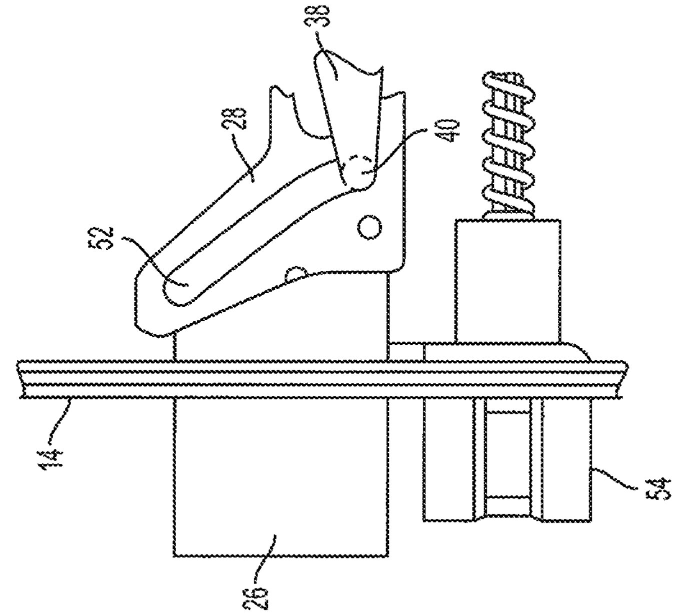
FIG. 3 is a side elevational view of a portion of the mortise lock of FIG. 1 showing the deadbolt arm and deadbolt in the projected or extended position, to lock the door.

Deadbolt arm 30 pivots around hub core 36, whose opposite ends extend through and are rotatably captured in circular openings in opposing sidewalls 16*a* and 16*b*. Deadbolt arm 30 comprises elongate portion 38 and hub portion 39, from which extends a finger 46. Elongated portion 38 has a tab 40 attached at the distal end thereof and is slideable within slot 52 of deadbolt bracket 28. Slot 52 has an angle approximately midway between vertical and horizontal, so that when tab 40 is moved up and down by rotation of elongated portion 38, it bears upon the walls of slot 52 to move deadbolt bracket 28 and consequently deadbolt 26 inward into lock 10 in a retracted position, to unlock the deadbolt, and outward from the lock 10 to a projected or extended position, to lock the deadbolt. FIGS. 2 and 3 illustrate deadbolt mechanism 24 configured with deadbolt 26 in the projected or locking position. When deadbolt 26 is in the locking position, portion 48*a* of spring 48 contacts and applies a force to finger 46 of hub portion 39 to maintain deadbolt 26 in the locking position. When deadbolt arm 30 is pivoted by the key 17 or thumbturn 88 to retract and move deadbolt 26 to the unlocked position, as shown in FIG. 4, such pivoting action creates a force sufficient to push finger 46 downward beyond spring 48 and position portion 48*a* of spring 48 to indented area 49 (FIG. 2) of hub portion 39. Spring 48 then contacts and applies a force to area 49 of hub portion 39 to maintain deadbolt 26 in the unlocked position.

Figure 5:
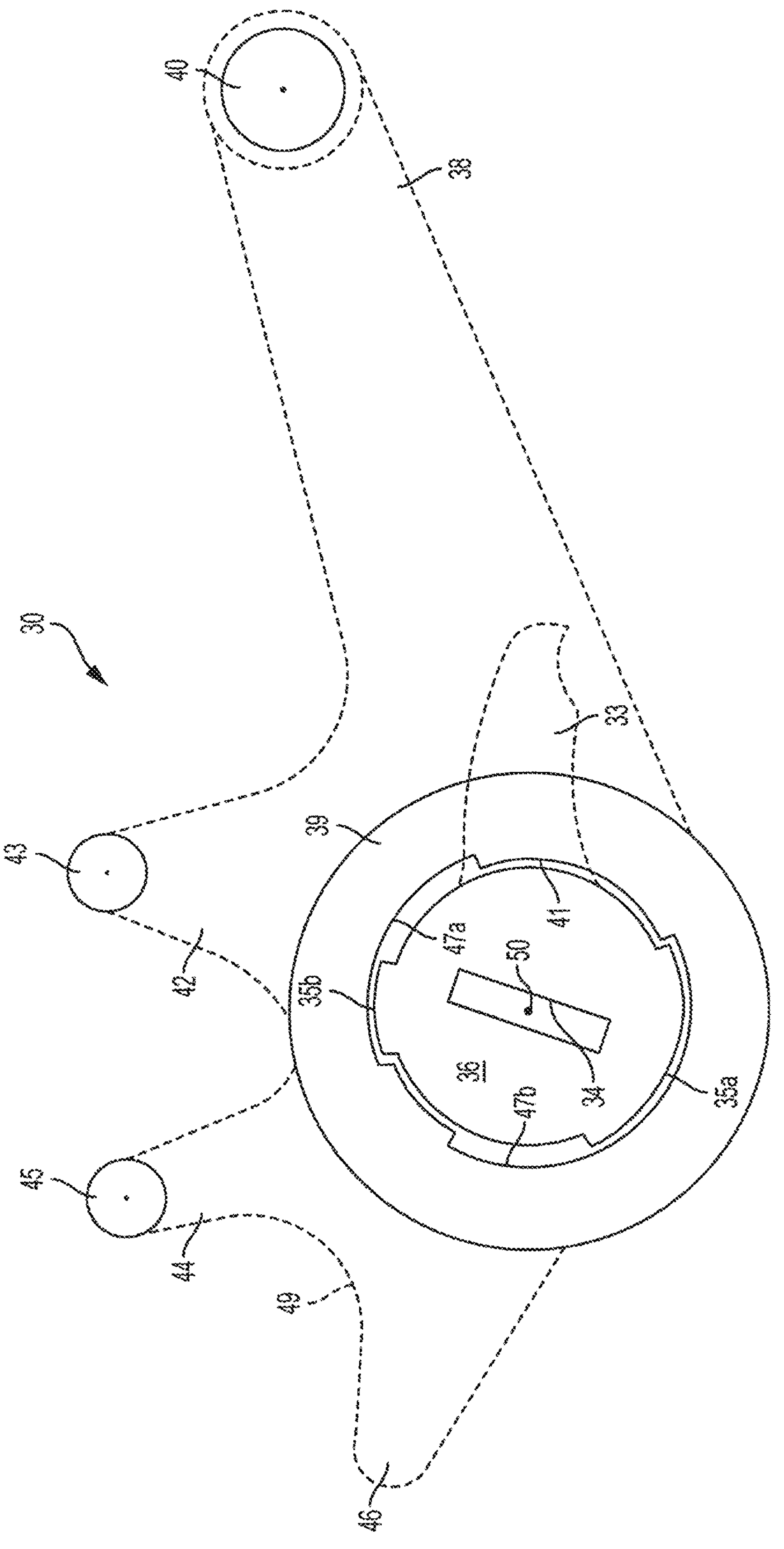
FIG. 5 is a cross-sectional view of the switchable hub core within the central opening of deadbolt arm of the present invention, showing an elevational view of the fingers, elongated portions and tabs of the deadbolt arm in phantom lines, as employed the mortise lock of FIG. 1.

Referring to FIG. 5, deadbolt arm 30 pivots and rotates about the axis 50 of hub core 36, which extends through an opening 41 in deadbolt arm hub portion 39. During operation by thumbturn 88, deadbolt arm 30 is pivoted by thumbturn blade shaft 64 which is inserted into slot 34 of hub core 36 (FIGS. 1-2). Hub core 36 will then rotate the deadbolt arm 30 clockwise or counterclockwise, depending on the direction of thumbturn 88 movement and the function configuration. Hub portion 39 also includes a V-configuration of fingers 42 and 44. During operation by key 17 in lock cylinder 13, downwardly extending arm 15 (FIG. 1) cooperates with fingers 42 and 44 (FIG. 2) to rotate the deadbolt arm 30 clockwise or counterclockwise. Such movement of elongated portion 38 down and up will retract and project the deadbolt 26, as described above.

Identification of the remaining features in FIGS. 1-4, and operation of the deadbolt and latchbolt, are described in U.S.

Pat. Nos. 5,678,870, 6,282,929, and 6,938,445, the disclosures of which are hereby incorporated by reference.

The deadbolt arm 30 and switchable hub core 36 of the present invention are shown in more detail in FIGS. 5 and 8-15. In FIGS. 5 and 9-15, deadbolt arm 30 is shown from the side opposite to that shown in FIGS. 2-4, so that elongate portion 38 extends out from hub portion 39 to the right and terminates in tab 40 which is configured to slide in and engage with slot 52 of deadbolt bracket 28 (FIGS. 2-4). Finger 46 extends leftward from hub portion 39 (FIG. 5), with indentation 49 between fingers 44 and 46, which operate with spring 48 as explained previously (FIG. 2). Fingers 42 and 44 extend upward in a V-configuration and terminate in tabs 43 and 45, respectively, and these fingers and/or tabs are contacted by arm 15 extending down from the lock cylinder 13 (FIG. 1) to rotate the deadbolt arm 30 clockwise or counterclockwise, and move elongated portion 38 down and up, to retract and project the deadbolt 26, as described above. In both the standard and classroom functions of operation, operation of lock cylinder 13 via key 17 will always operate to retract and project the deadbolt.

Figure 11:
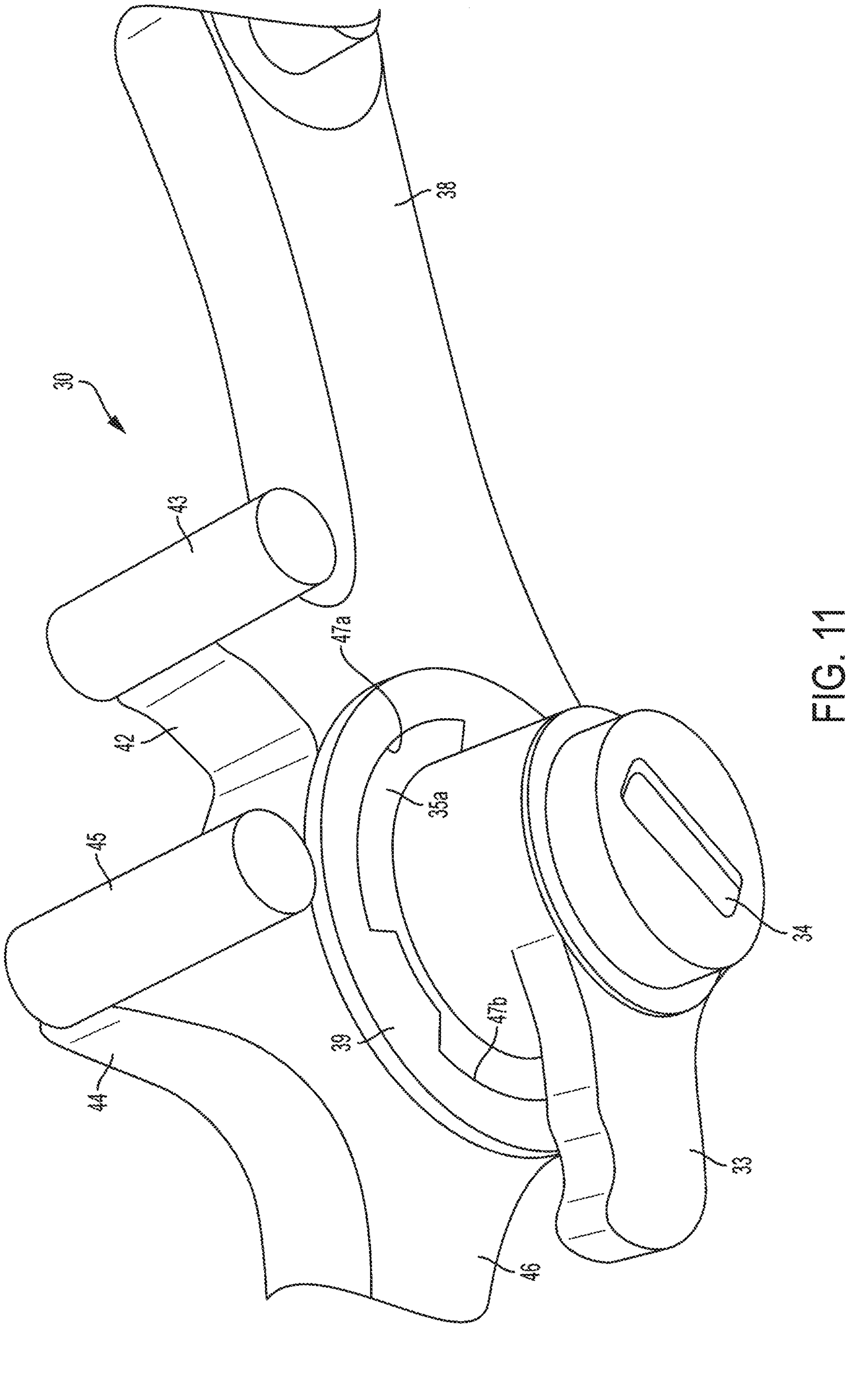
Figure 13:
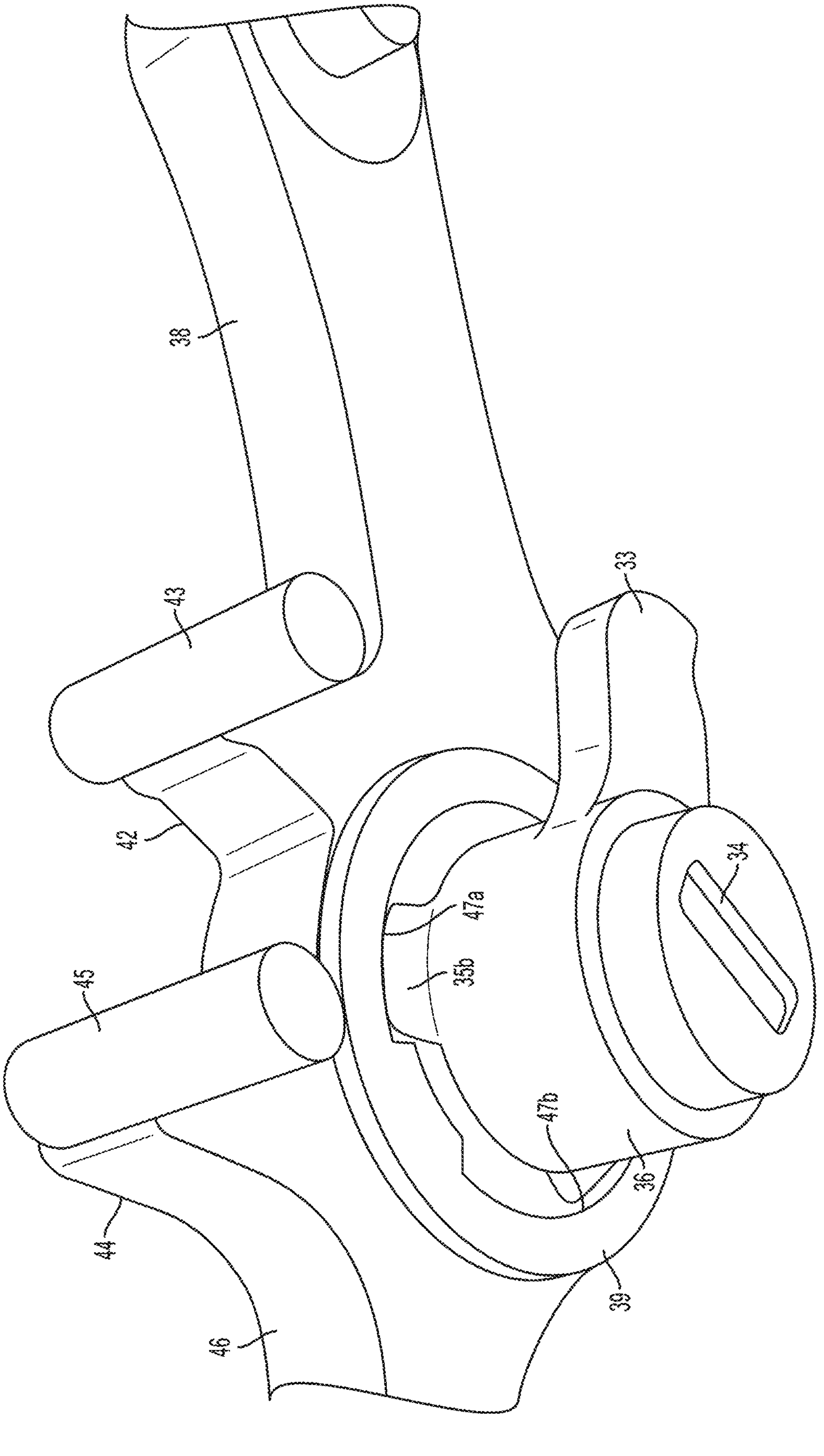
Figure 14:
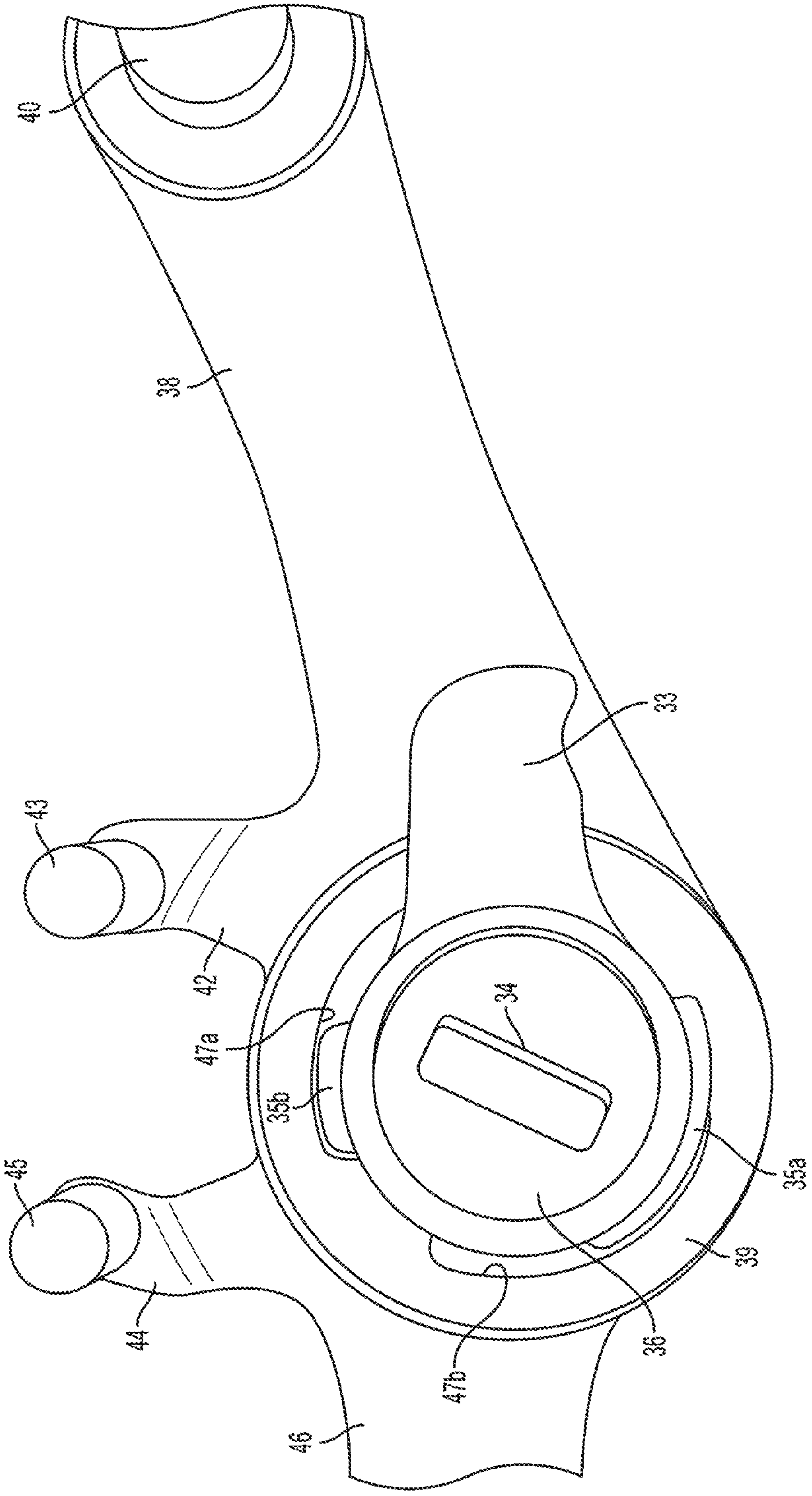

Hub core 36 has a generally cylindrical body with a central slot 34, and is disposed in and extends through central opening 41 in hub portion 39 of deadbolt arm 30. In the embodiment shown, the thickness of hub core 36 in the axial direction is greater than that of deadbolt arm hub portion 39 (FIGS. 11 and 13). Hub core arm 33 extends radially outward from the hub core 36. As described previously, hub core slot 34 is engaged by blade shaft 64 of the thumbturn 88 on the inner side of the door to rotate the hub slot core and cause the desired movement, or lack of movement, in the deadbolt arm 30 to effect the desired movement or lack of movement in the deadbolt 26, depending on the selected function of operation.

Figure 7:
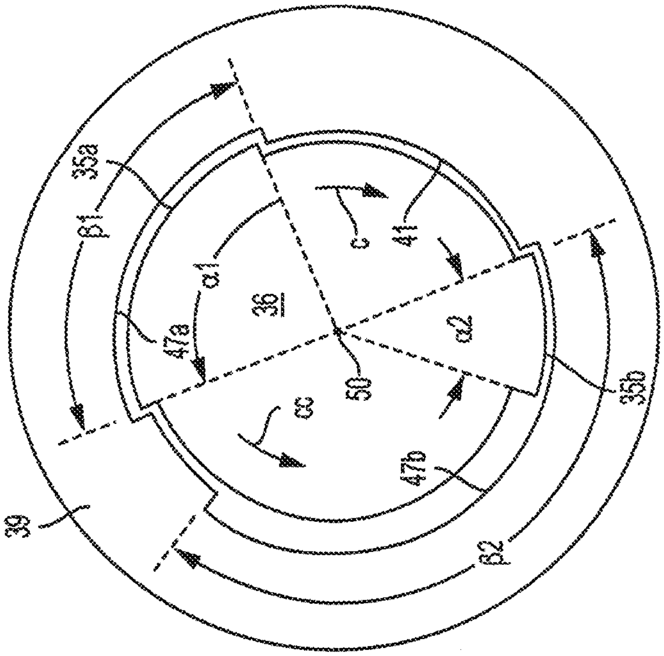
FIG. 7 is a cross-sectional view of the switchable hub core within the central opening of deadbolt arm of FIG. 5, showing the hub core positioned within the opening of the deadbolt arm for the standard function of operation of the deadbolt.
Figure 6:
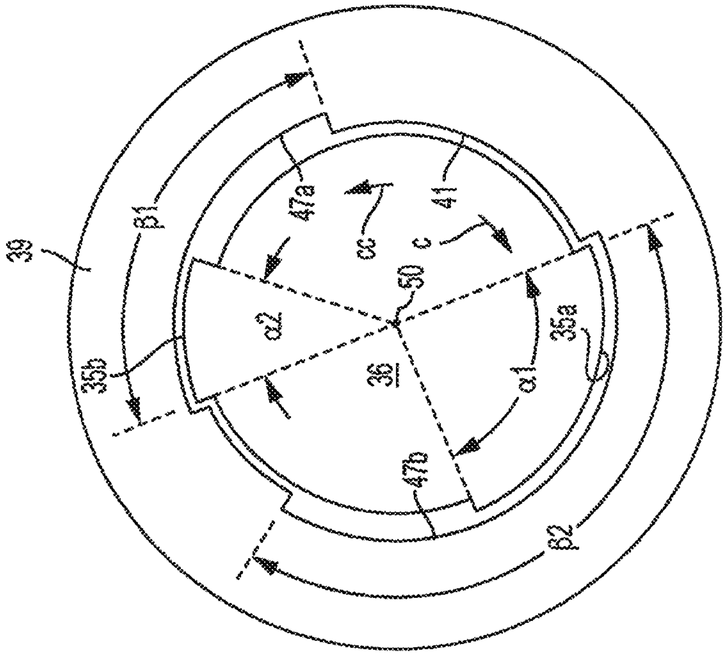
FIG. 6 is a cross-sectional view of the switchable hub core within the central opening of deadbolt arm of FIG. 5, showing the hub core positioned within the opening of the deadbolt arm for the classroom function of operation of the deadbolt.

Hub core 36 employs a selective "keying" feature within deadbolt arm opening 41 to determine function of operation of the deadbolt 26. Hub core 36 has a pair of arcuate segments or projections 35*a*, 35*b* extending radially outward around its periphery, the segments or projections 35*a*, 35*b* which extend into arcuate indentations or slots 47*a*, 47*b* formed in the inner wall of deadbolt arm hub portion 39. As shown in FIGS. 6 and 7, the hub core projections 35*a*, 35*b* and deadbolt arm slots 47*a*, 47*b* have dimensions that may be described by angles $\alpha$ and $\beta$, respectively, extending about axis 50. Hub core first projection 35*a* has an angle or arc length of $\alpha_1$ and hub core second projection 35*b* has an angle or arc length of $\alpha_2$. Deadbolt arm first slot 47*a* has an angle or arc length of $\beta_1$ and deadbolt arm second slot 47*b* has an angle or arc length of $\beta_2$. The angles or arc widths may vary from that shown. For example, the arc length of the hub core first projection 35*a* may be about 45°+/−5°-15° and the arc length of the hub core second projection 35*b* may be about 90°+/−5°-15°, while the arc length of the deadbolt arm first slot 47*a* may be about 90°+/−5°-15° and the arc length of the deadbolt arm second slot 47*b* may be about 135°+/−5°-15°. The first and second hub core projections 35*a*, 35*b* are generally opposite each other, and one edge or end of the first projection 35*a* may be about 180° opposite one edge or end of the second projection 35*b*. Similarly, the first and second deadbolt arm slots 47*a*, 47*b* are generally opposite each other, and one edge or end of the first slot 47*a* may be about 180° opposite one edge or end of the second slot 47*b*.

Figure 8:
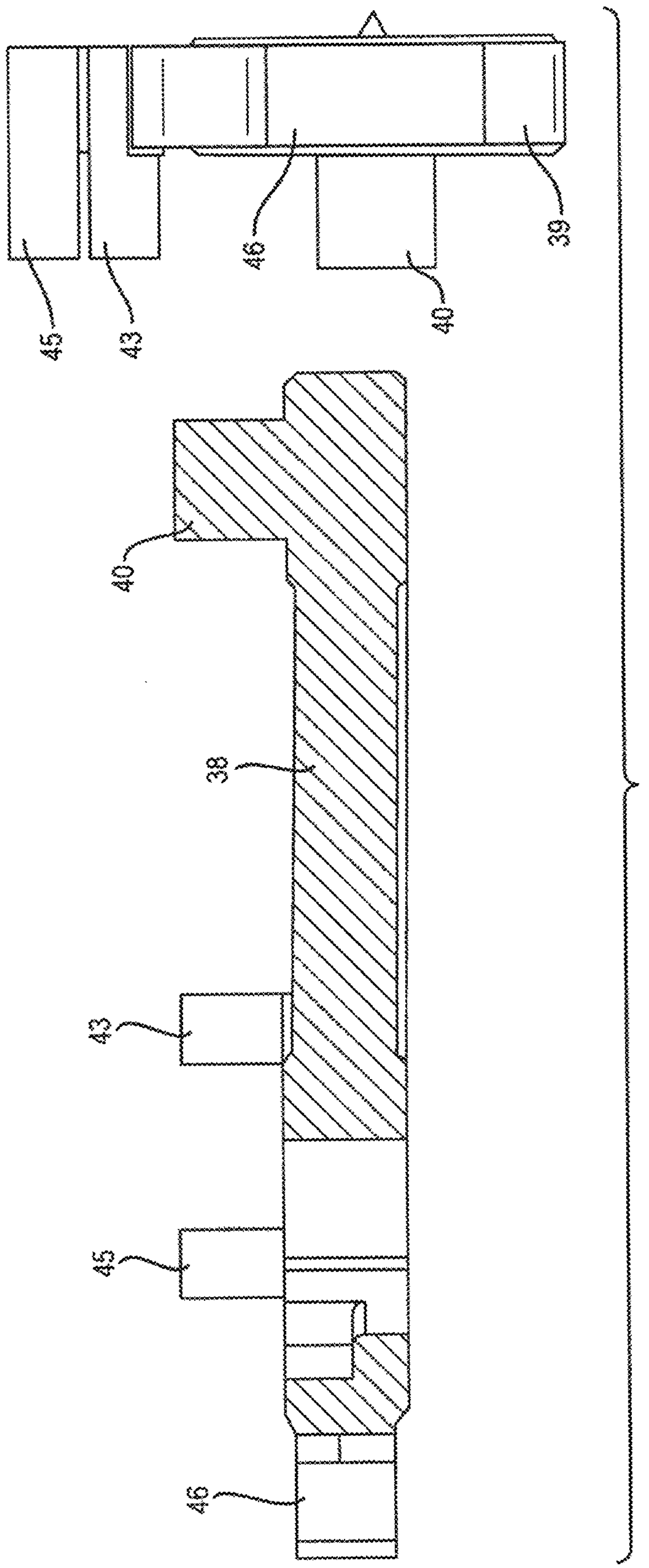
FIG. 8 shows various views of the deadbolt arm of FIG. 5.
Figure 9:
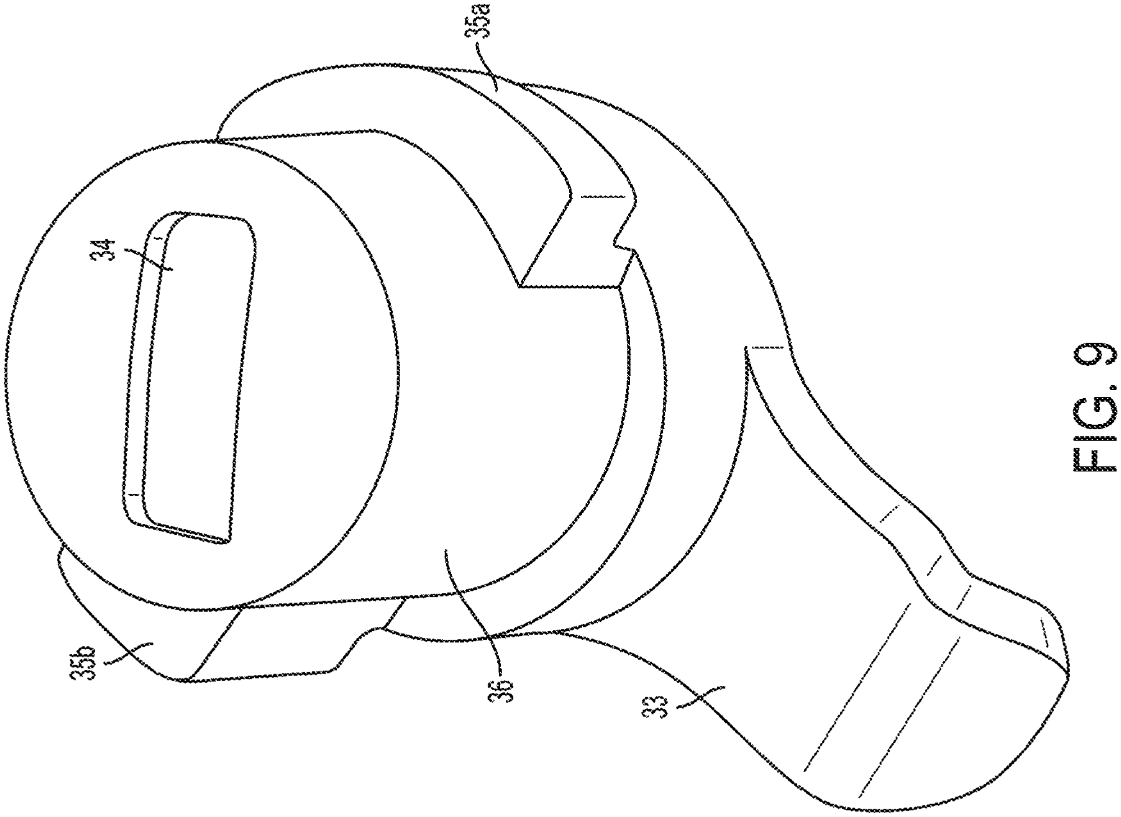
FIGS. 9-15 are various perspective views of the switchable hub core and/or deadbolt arm of the present invention.
Figure 10:
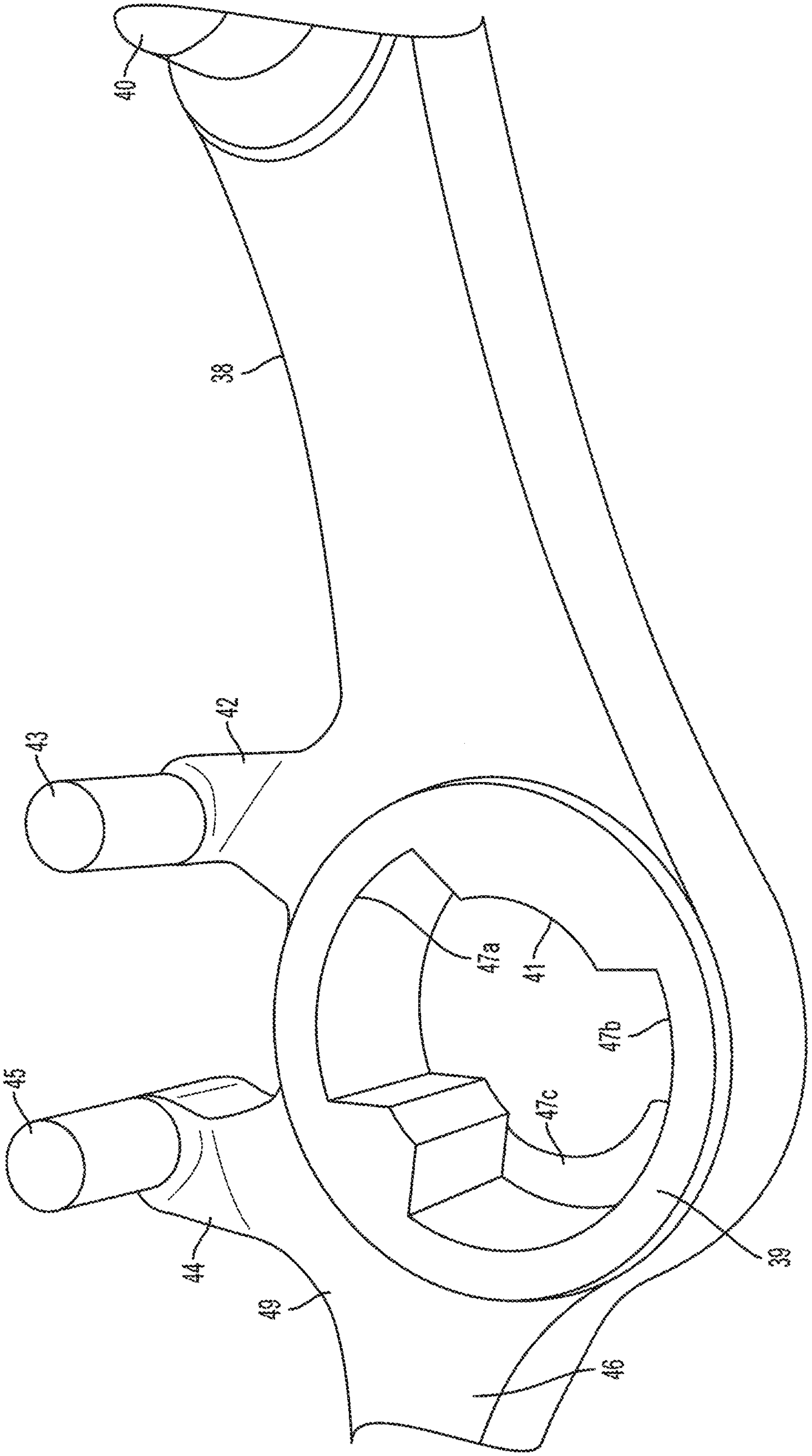

Hub core projections 35*a*, 35*b* may also differ in their thickness and location on the hub core 36, in an axial direction along the thickness of the hub core 36. As shown in FIG. 9, both projections 35*a*, 35*b* have thicknesses less than that of the body of hub core 36, with projection 35*b* extending more than half of the hub core body thickness starting at the end closest to arm 33, and projection 35*a* extending less than half of the hub core body thickness starting at the end closest to arm 33. Slot 47*a* formed in deadbolt arm inner wall 41 extends completely through the thickness of hub portion 39 (FIG. 10). Slot 47*b* has a portion, with an arcuate length approximately equal to arcuate length $\alpha_2$ of hub core projection 35*b*, that extends completely through the thickness of hub portion 39, and a portion that extends less than the hub portion thickness, leaving an arcuate lower lip or flange 47*c* of arcuate length approximately equal to $\beta_2$-$\alpha_2$, as shown in FIGS. 8, 9, and 10.

The arc lengths and thicknesses of the hub core projections in the deadbolt arm slots are configured to permit the deadbolt arm to rotate in a manner of the standard function when the hub core is disposed in the deadbolt arm in one position, and to permit the deadbolt arm to rotate in a manner of the classroom function when the hub core is disposed in the deadbolt arm in another position.

Figure 12:
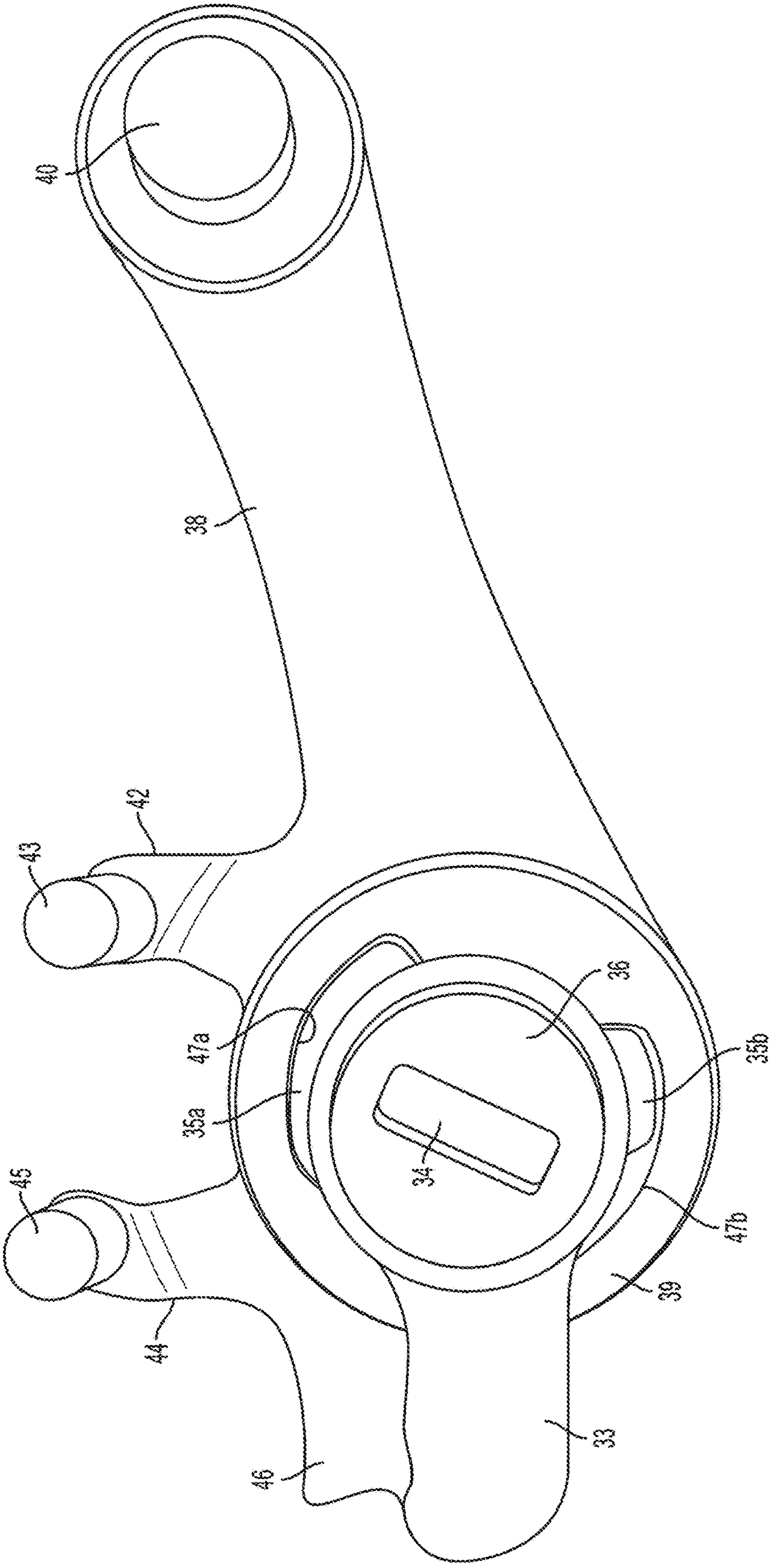

In the example shown in FIGS. 7, 11, and 12, hub core 36 is in a first position in deadbolt arm opening 41 for the standard function of deadbolt operation, with hub core projection 35*a* in deadbolt arm slot 47*a*, and hub core projection 35*b* in deadbolt arm slot 47*b*. The arc length $\alpha_1$ of hub core projection 35*a* is comparable and approximately equal to the arc length of $\beta_1$ of deadbolt arm slot 47*a*. Hub core projection 35*b* extends into the portion of deadbolt arm slot 47*b* that extends through the entire thickness of the deadbolt arm huh 39. Hub core projection 35*a* has a tight fit rotationally about the axis of the hub slot within and with respect to deadbolt arm slot 47*a* (filling the arcuate length of slot 47*a*), and hub core projection 35*b* has a tight fit rotationally about the axis of the hub slot within and with respect to a portion of deadbolt arm slot 47*b* (filling the arcuate length of slot 47*b* that extends completely through the thickness of deadbolt arm hub portion 39) so that hub core rotation in either direction causes deadbolt arm rotation. This close fit between the projection(s) and slot causes any rotation of hub 36 by thumbturn 88 in either the clockwise direction C or the counterclockwise direction CC (FIG. 7) to similarly rotate the hub portion 39 and deadbolt arm 30. Such rotation occurs despite the fact that the arc length $\alpha_2$ of hub core projection 35*b* is considerably less than the arc length of $\beta_2$ of deadbolt arm slot 47*b*.

Figure 15:
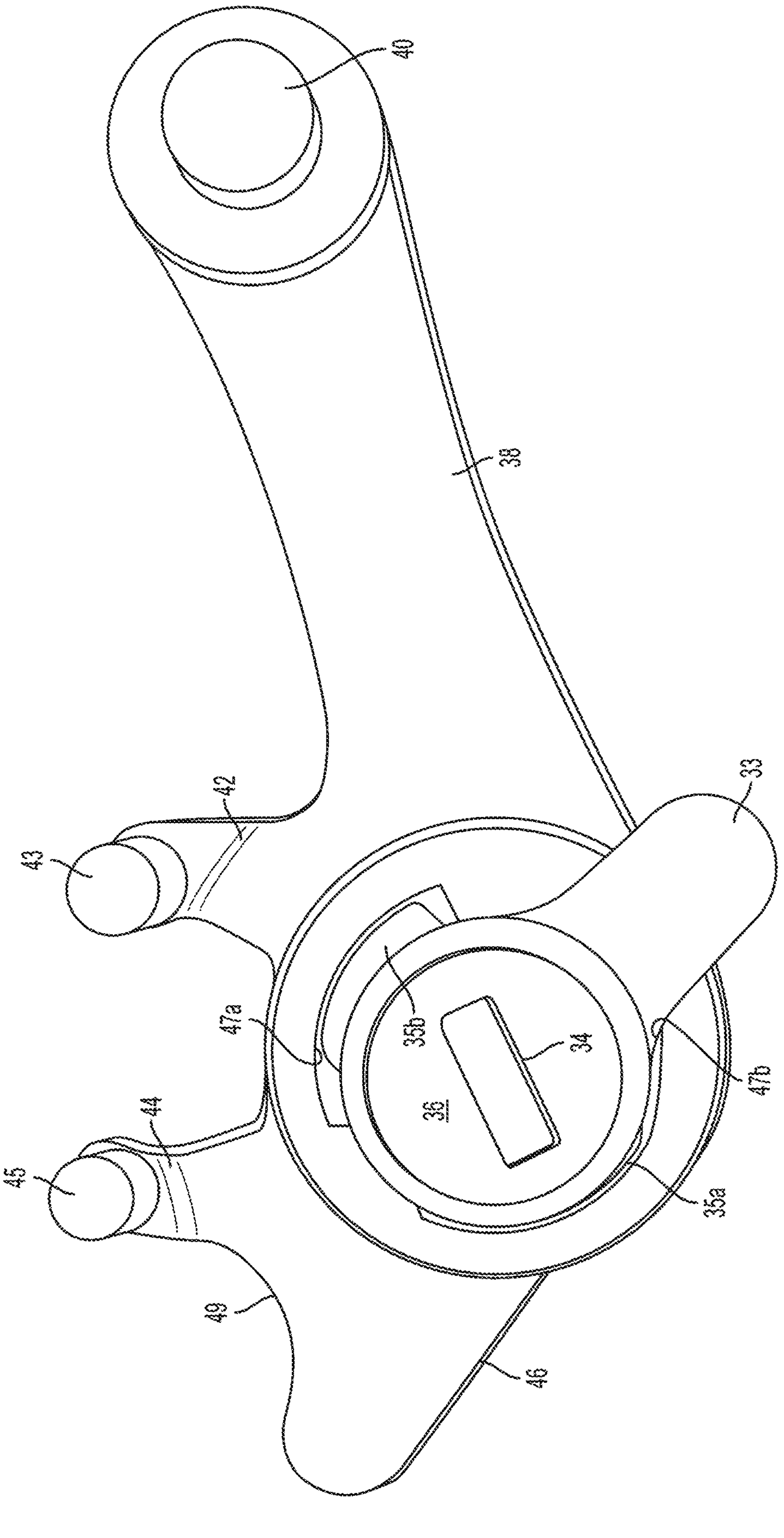
Figure 17:
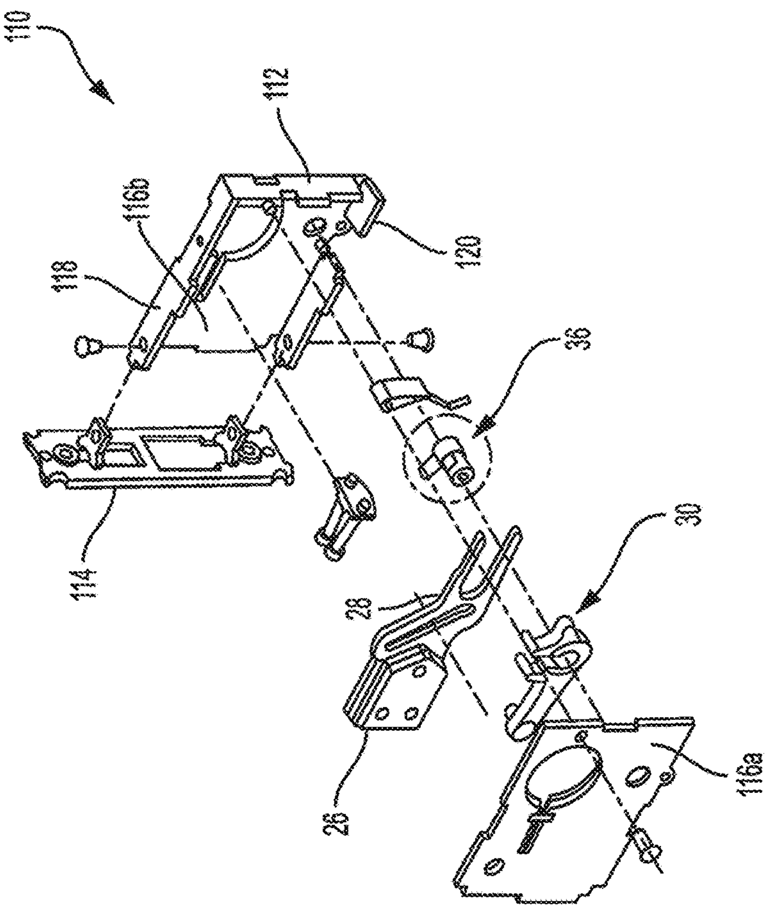
FIG. 17 is a perspective, partially exploded view of the auxiliary mortise lock of FIG. 16.
Figure 16:
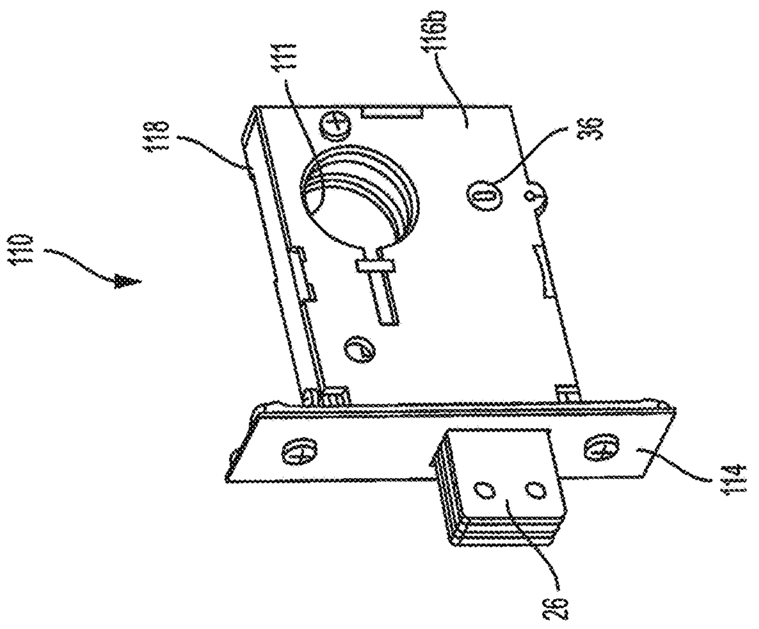
FIG. 16 is a perspective view of an auxiliary mortise lock incorporating the hub core and the deadbolt arm of the present invention, switchable between standard and classroom functions.
Figure 18:
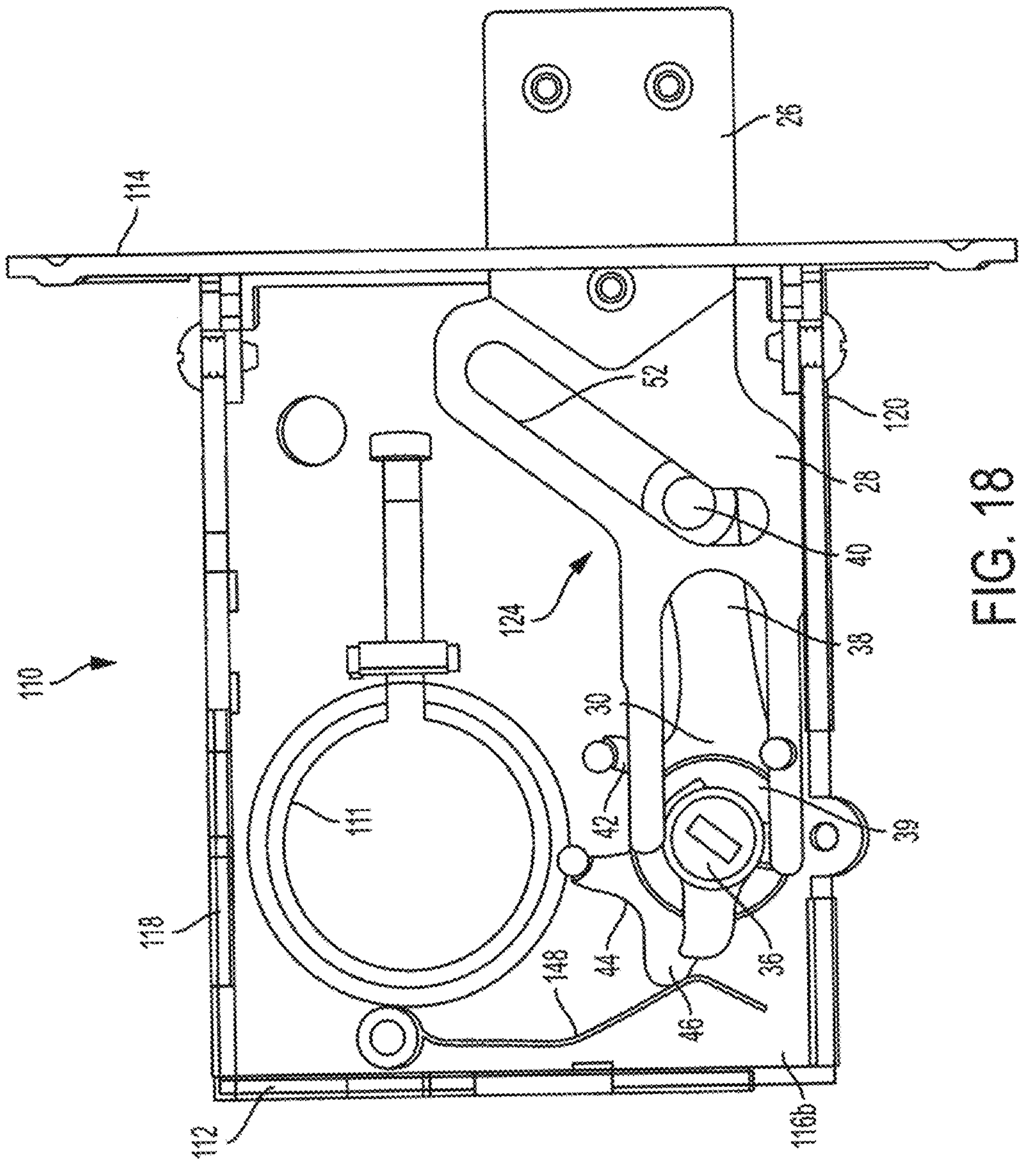
FIG. 18 is a side elevational view, with the side panel removed, of the auxiliary mortise lock of FIG. 16.

To provide the classroom function of operation of the deadbolt, hub core 36 is placed in a second position in the opposite manner of FIG. 7, and is shown in FIGS. 5, 6, 13, 14, and 15 with core projection 35*b* in deadbolt arm slot 47*a*, and hub core projection 35*a* in deadbolt arm slot 47*b*. In this second position, the arc lengths of hub core projections 35*a*, 35*b* are both considerably less than the arc lengths of deadbolt arm slots 47*b*, 47*a* into which they respectively project, thus creating a loss or lost motion connection between the projections 35*a*, 35*b* and the slots 47*a*, 47*b* wherein for a portion of the rotation of the hub core 36, there is no rotation of the deadbolt arm 30. Both hub core projections 35*a*, 35*b* have a loose fit rotationally about the axis of the hub slot within and with respect to deadbolt arm slots 47*b*, 47*a*, i.e., any hub rotation does not necessarily cause deadbolt arm rotation. However, in the initial positions shown in FIGS. 5, 6, 13, and 14, both hub core projections 35*a*, 35*b* have one edge or end in contact with one edge or end of slots 47*b*, 47*a*, respectively, so that upon counterclockwise rotation of hub core 36 in direction CC (FIG. 6) by thumbturn 88, deadbolt arm hub portion 39 and the deadbolt arm 30 will be caused to also rotate in the counterclockwise direction, and cause the deadbolt 26 to retract. However, upon rotation of the thumbturn 88 in the opposite, clockwise direction, because of the smaller angular lengths of the projections 35*a*, 35*b* in the slots 47*a*, 47*b*, the thickness of the projections, and the spacing between the other edges of ends of the projections and slots, the hub core 36 will rotate clockwise within deadbolt arm opening 41 and the projections 35*a*, 35*b* will slide within their respective slots 47*a*, 47*b* to the opposite ends of the slots without causing rotation or other movement to the deadbolt arm 30 (FIG. 15).

As shown in FIGS. 6-7, the dimensions of the hub core 36 outer periphery, including those of the projections 35*a*, 35*b*, and the dimensions of the deadbolt arm hub portion 39 central opening, including those of the slots 47*a*, 47*b*, should be configured to permit a snug sliding fit between the two as the hub core 36 is slid axially into the deadbolt arm 30 opening during assembly of the lock. The dimensions of the arc lengths of the hub core projections 35*a*, 35*b* and deadbolt arm opening slots 47*a*, 47*b* may be different from that shown, but should be selected so that they operate as described above in the standard and classroom function of operation of the deadbolt.

Figure 19:
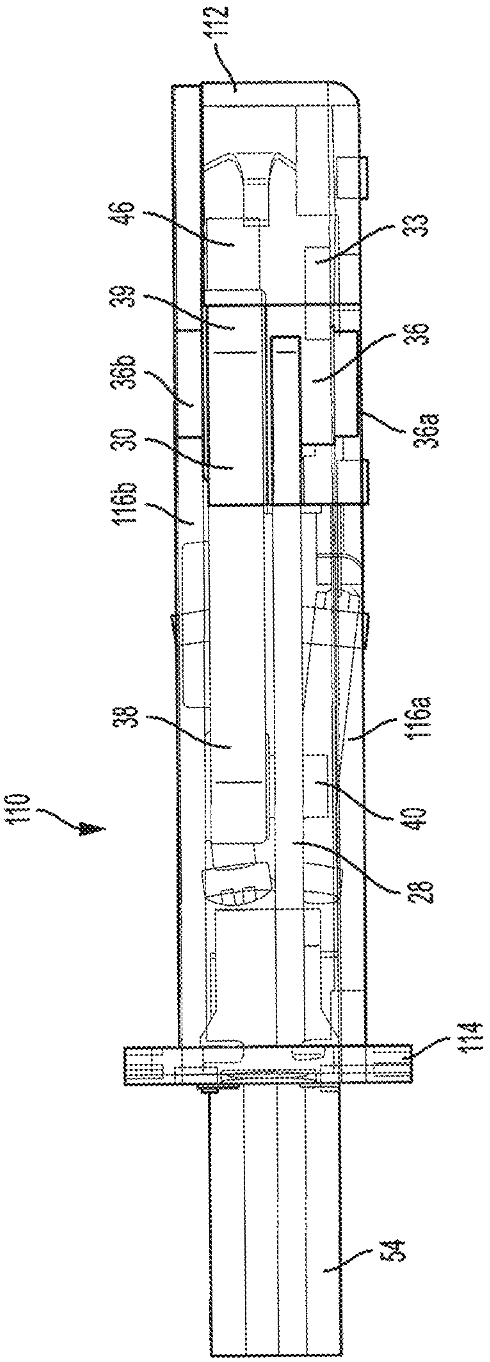
FIG. 19 is a bottom view of the auxiliary mortise lock of FIG. 16.
Figure 20:
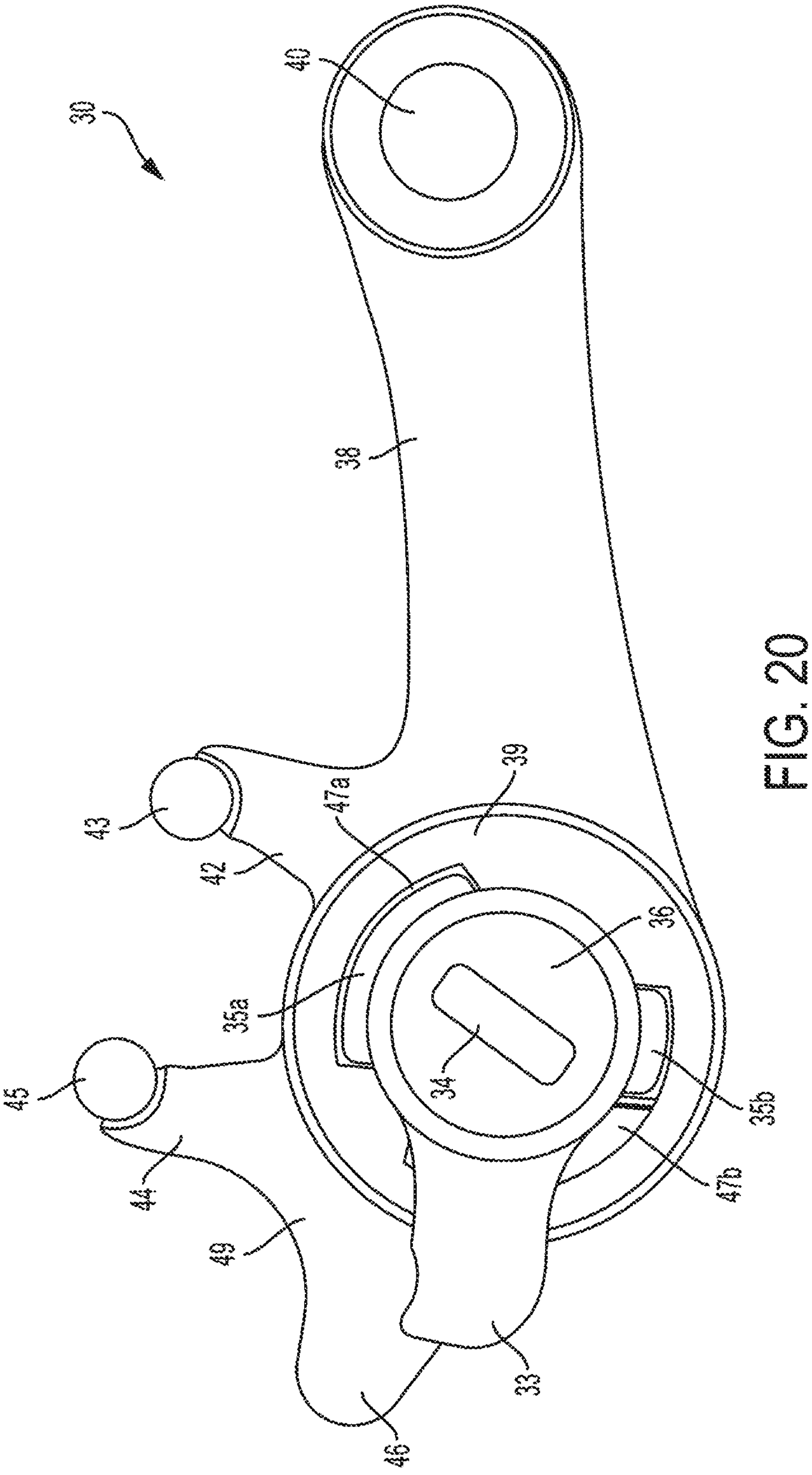
FIGS. 20 and 21 are opposite side elevational views of the hub core positioned within the opening of the deadbolt arm for the standard function of operation of the deadbolt.
Figure 21:
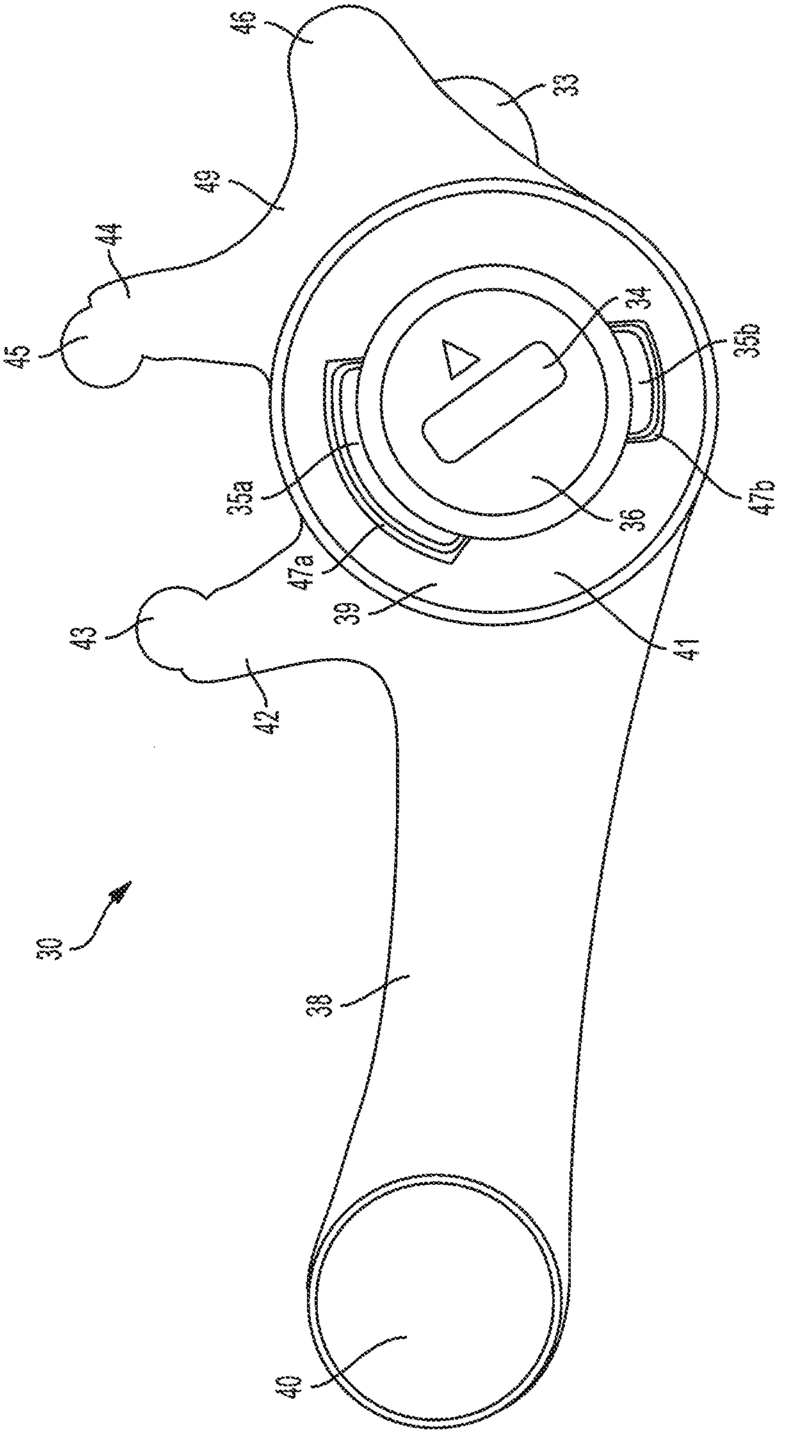
Figure 22:
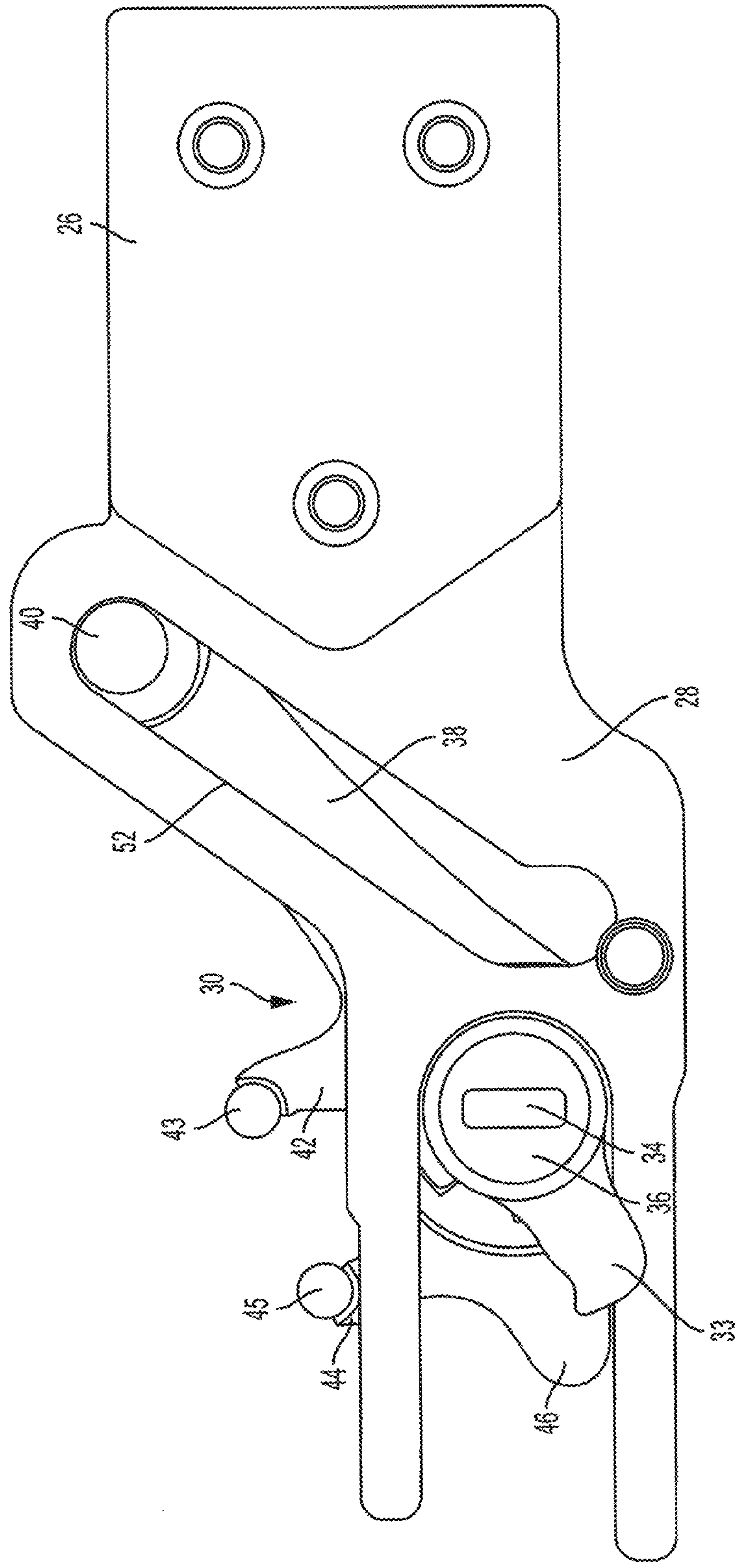
FIGS. 22 and 23 are opposite side elevational views of the hub core and deadbolt arm, positioned in the standard function of operation, retracting the deadbolt bracket.
Figure 23:
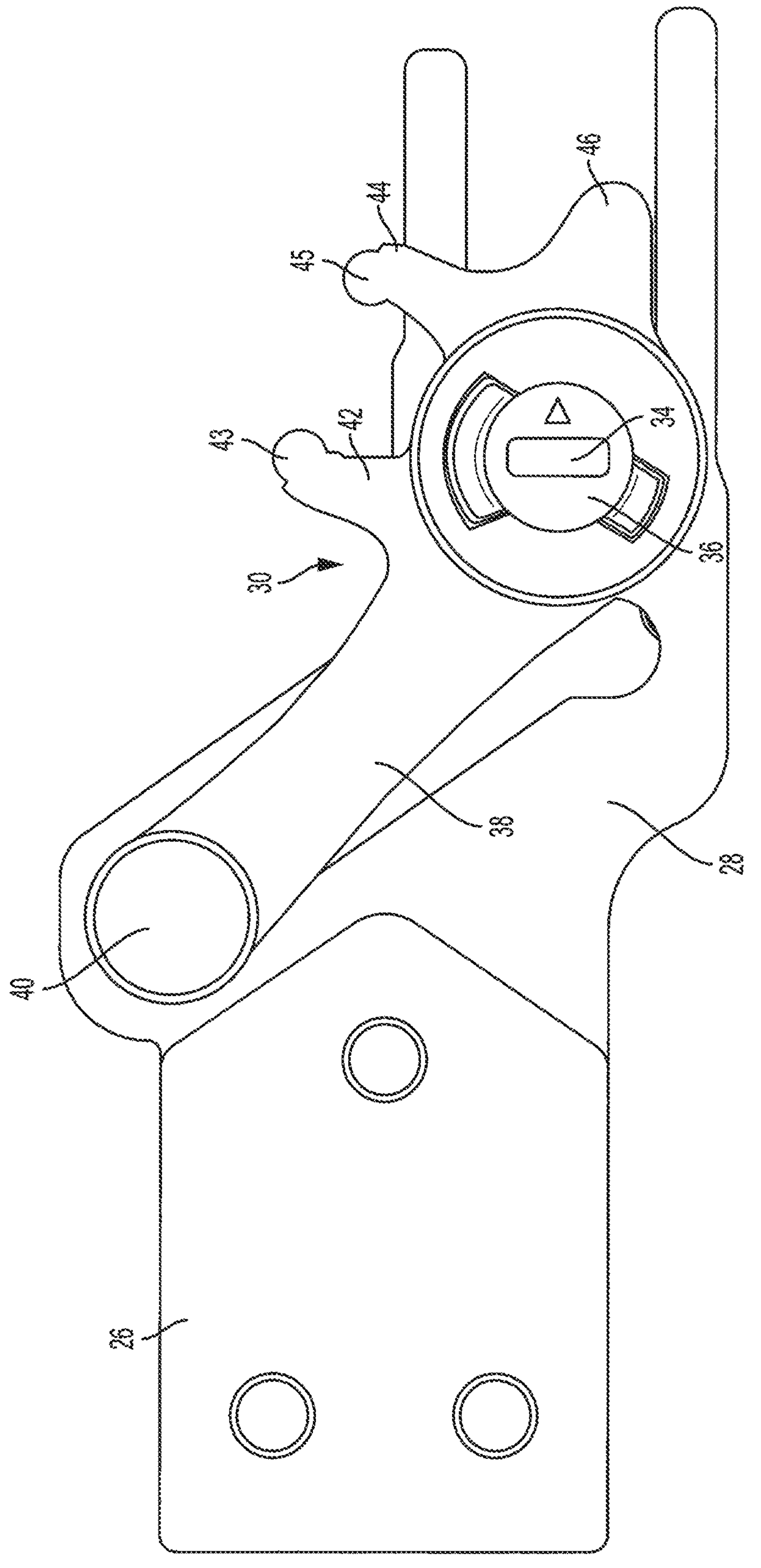
Figure 24:
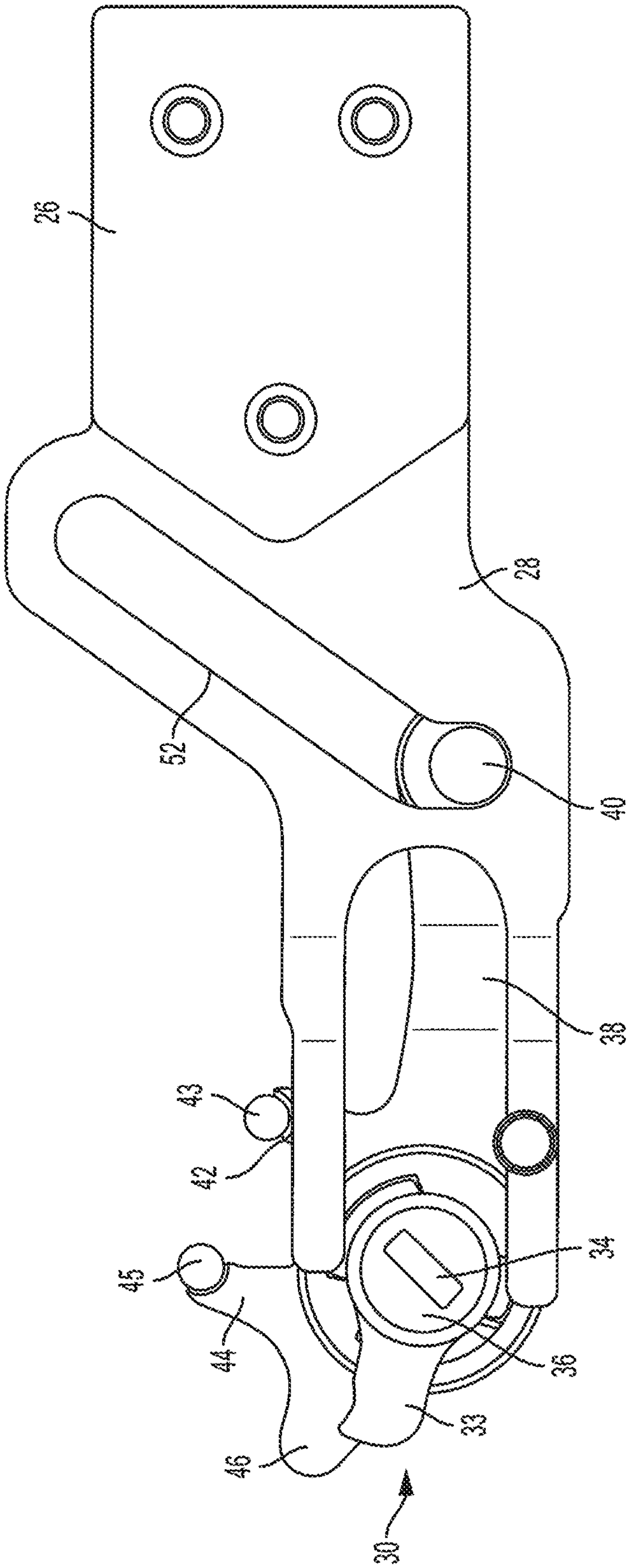
FIGS. 24 and 25 are opposite side elevational views of the hub core and deadbolt arm, positioned in the standard function of operation, projecting the deadbolt bracket.
Figure 25:
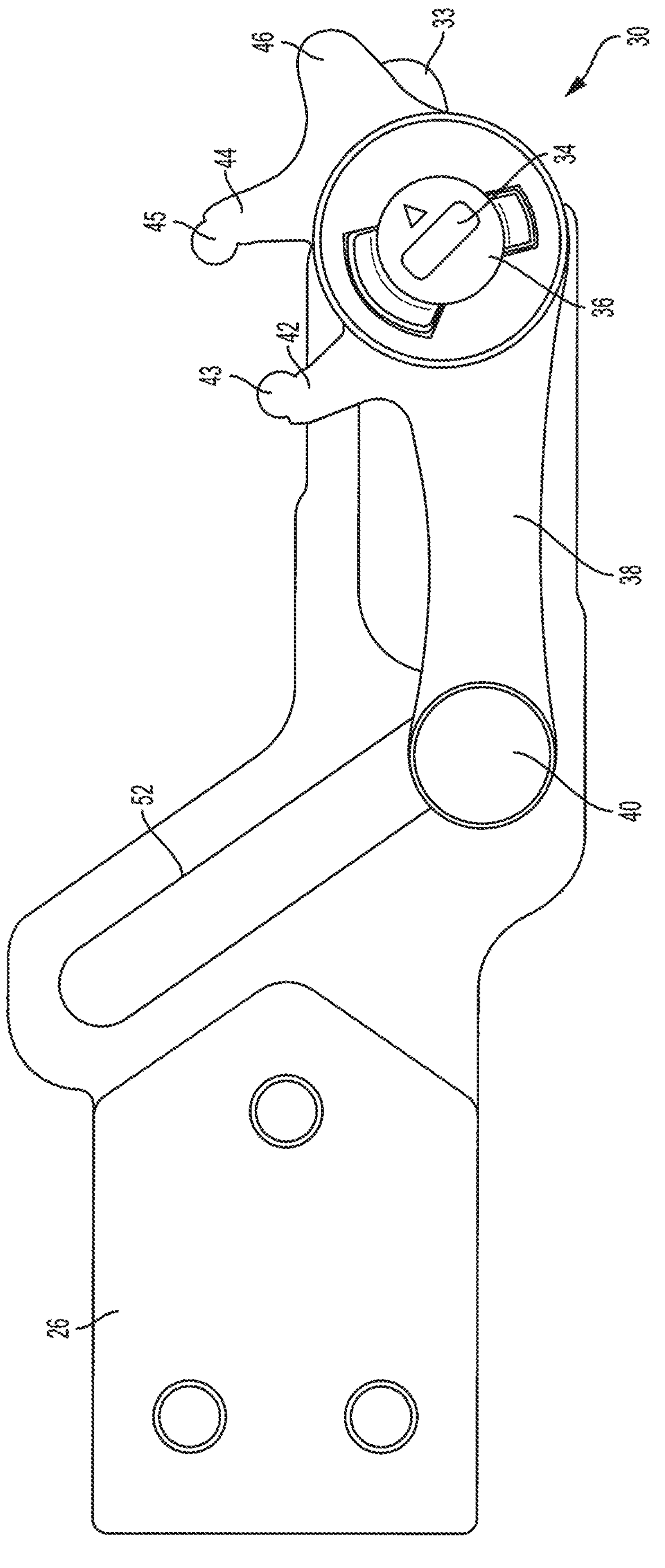

The hub core and deadbolt arm of the present invention are shown in connection with an auxiliary mortise lock 110 in FIGS. 16-19. The housing components of auxiliary mortise lock 110 are similar to those shown in the full mortise lock of FIGS. 1-4, except that the numeral "1" has been added in front of the comparable number. Auxiliary mortise lock incorporates within casing 112 a deadbolt mechanism 124 comparable to deadbolt mechanism 24 in the full mortise lock of FIG. 2 and operable by the inside thumbturn and outside lock cylinder control members, but includes no latchbolt mechanism. Hub core 36 has ends 36*a*, 36*b* containing slot 34 rotatable within comparably sized openings in opposing sidewalls 116*a* and 116*b* (FIG. 19). The construction and operation of deadbolt arm 30 around and with respect to switchable hub core 36 are the same in auxiliary mortise lock 110 as they are in full mortise lock 10.

The operation of the hub core 36 within the opening of the deadbolt arm 30 for the standard function of operation of the deadbolt 26 is shown in FIGS. 20-25. Hub core projection 35*a* is snugly positioned in deadbolt arm slot 47*a*, and hub core projection 35*b* is positioned into the portion of deadbolt arm slot 47*b* that extends through the entire thickness of the deadbolt arm hub 39. This close fit permits the inner thumbturn control member to rotate hub 36 and deadbolt arm 30 in one direction to the retracted position shown in FIGS. 22 and 23 to unlock the deadbolt, and then in the opposite direction back to the projected position of FIGS. 24 and 25 to lock the deadbolt.

Figure 26:
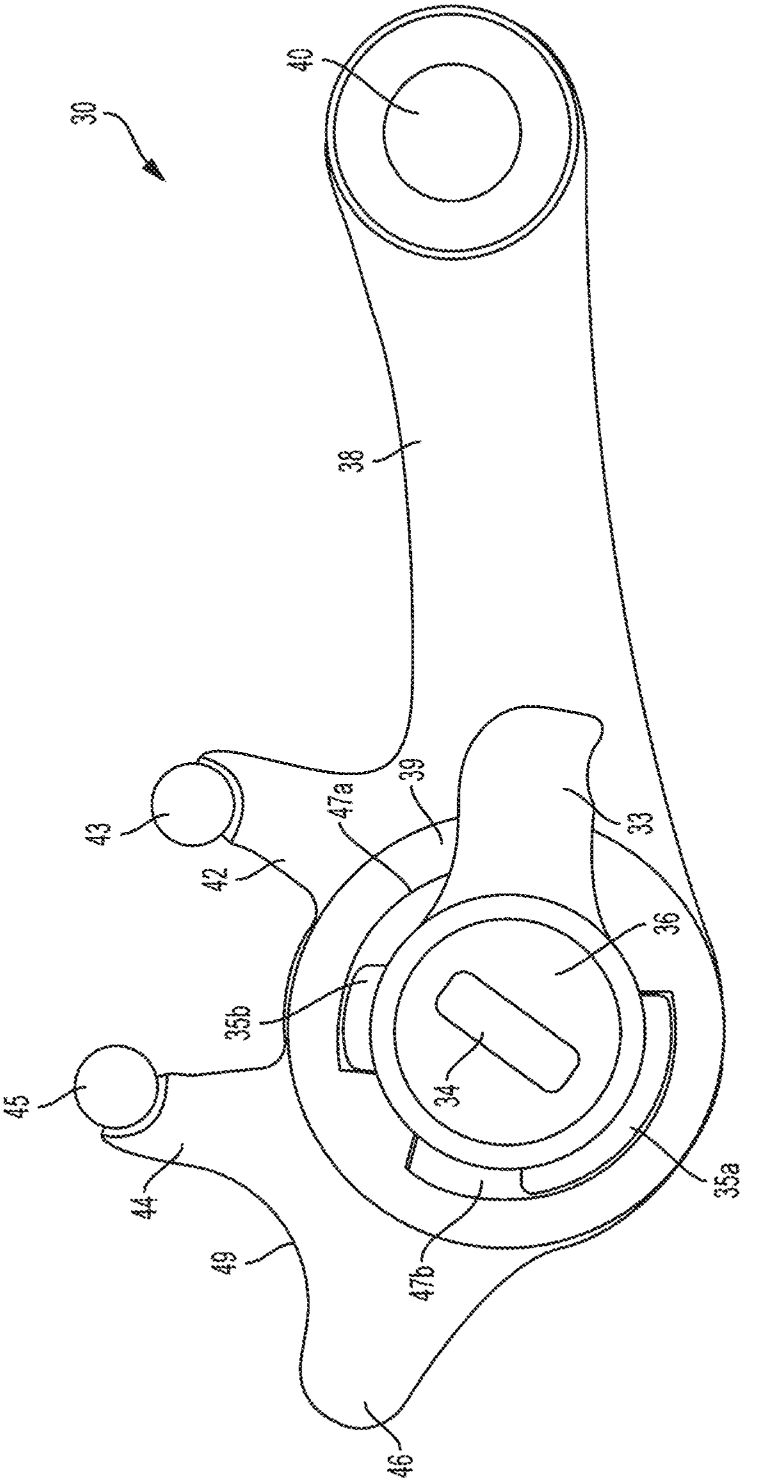
FIGS. 26 and 27 are opposite side elevational views of the hub core positioned within the opening of the deadbolt arm for the classroom function of operation of the deadbolt, after the inside thumbscrew control member has rotated the hub core to retract the deadbolt.
Figure 27:
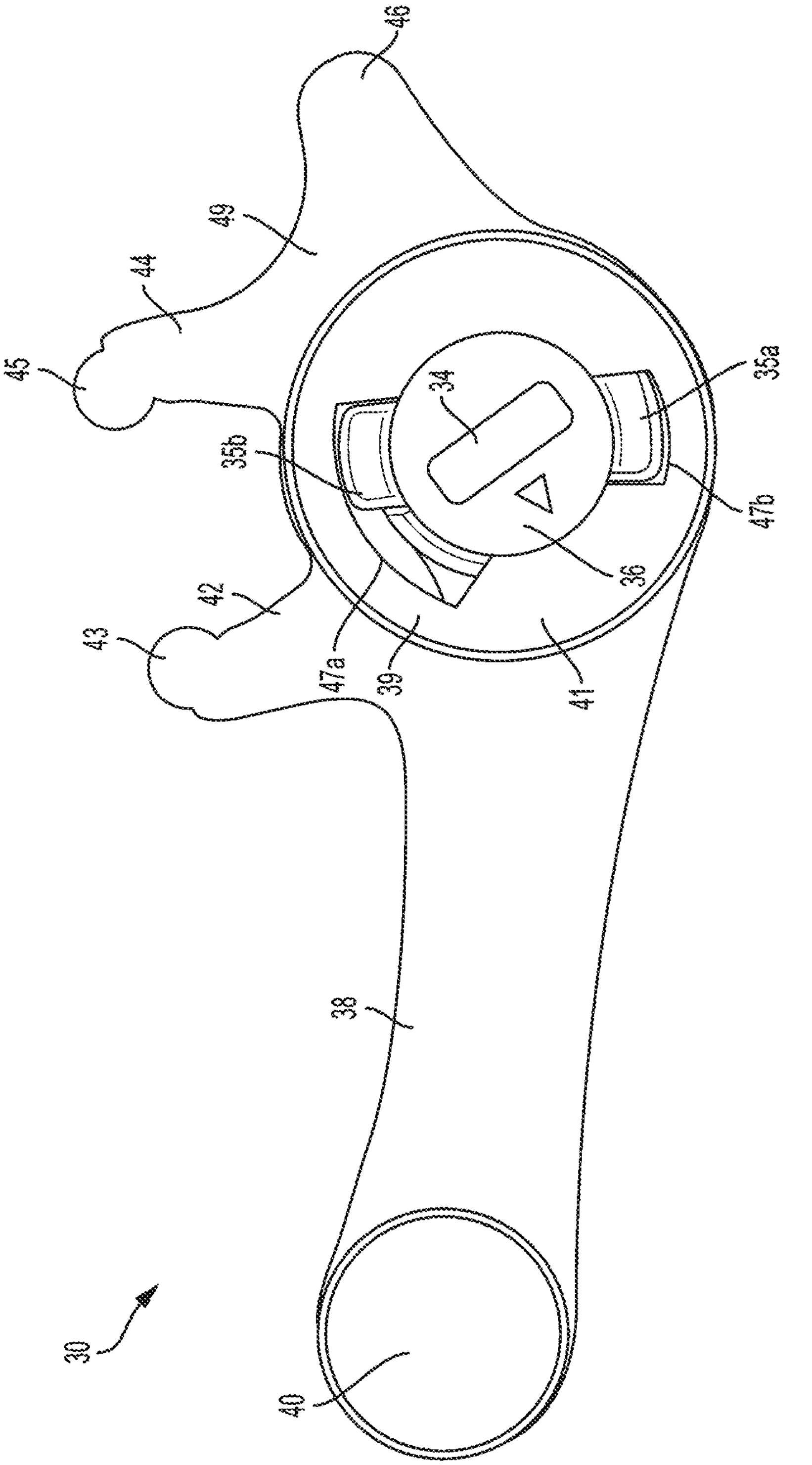
Figure 28:
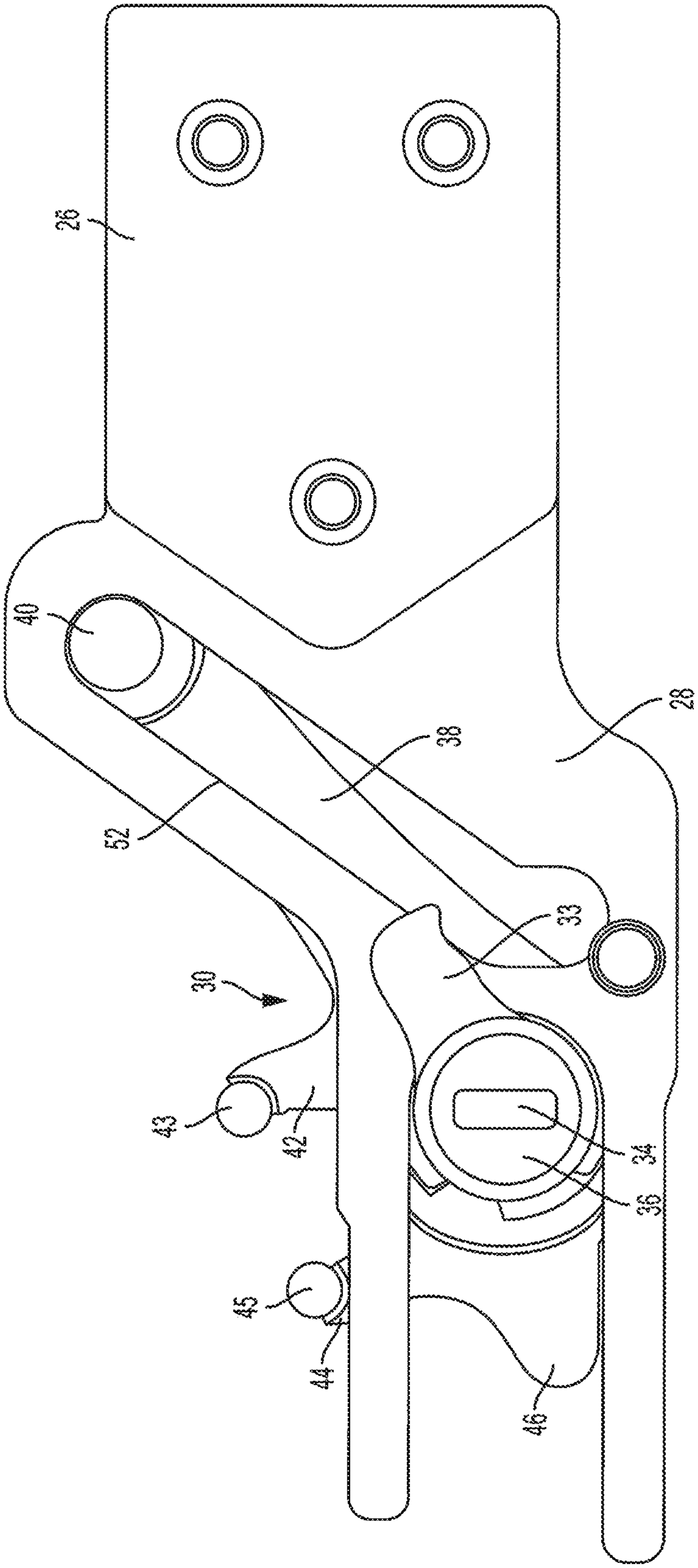
FIGS. 28 and 29 are opposite side elevational views of the hub core and deadbolt arm, positioned in the classroom function of operation, retracting the deadbolt bracket.
Figure 29:
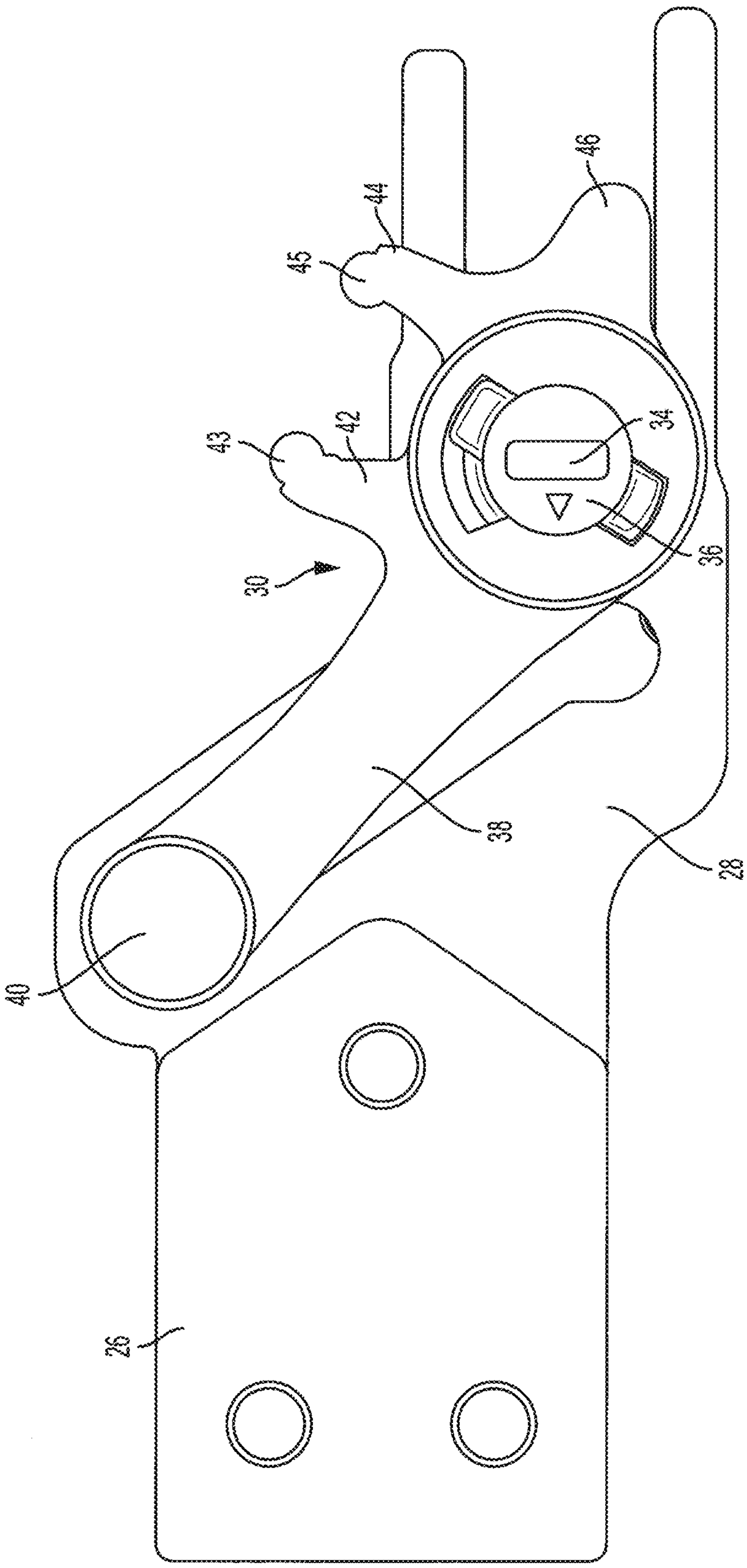
Figure 30:
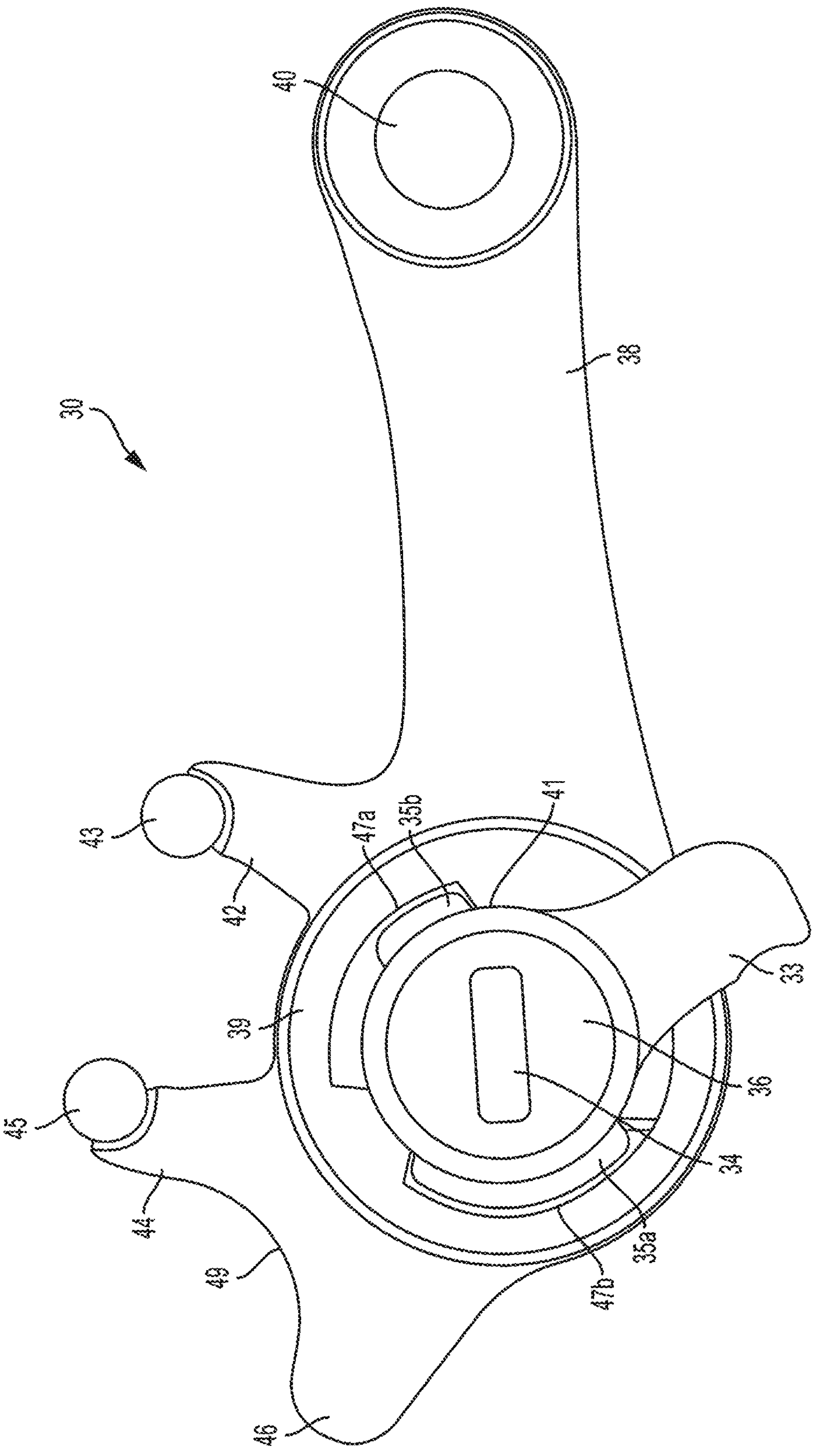
FIGS. 30 and 31 are opposite side elevational views of the hub core positioned within the opening of the deadbolt arm for the classroom function of operation of the deadbolt, after the inside thumbscrew control member has rotated the hub core to attempt to project the deadbolt.
Figure 31:
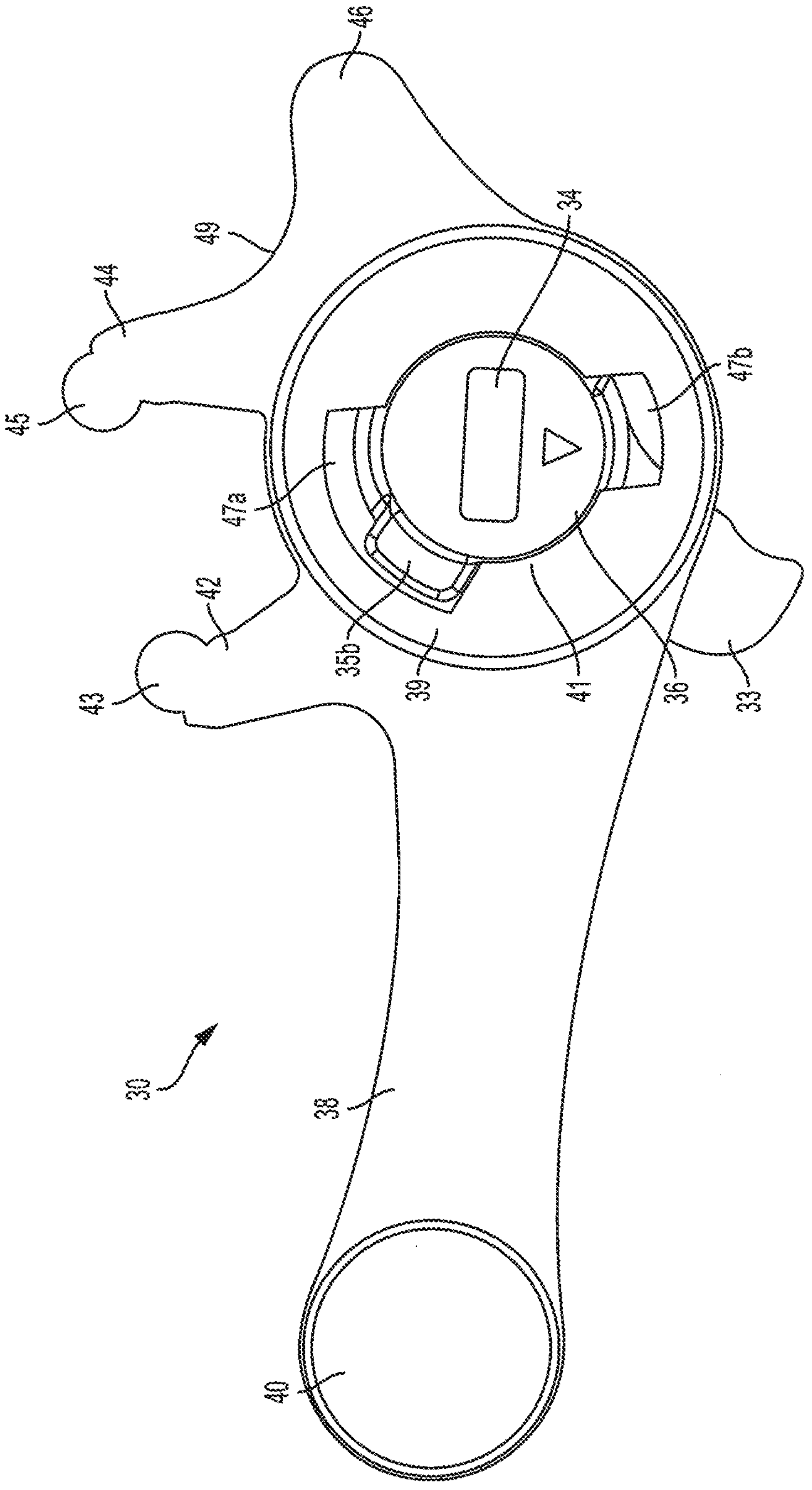
Figure 32:
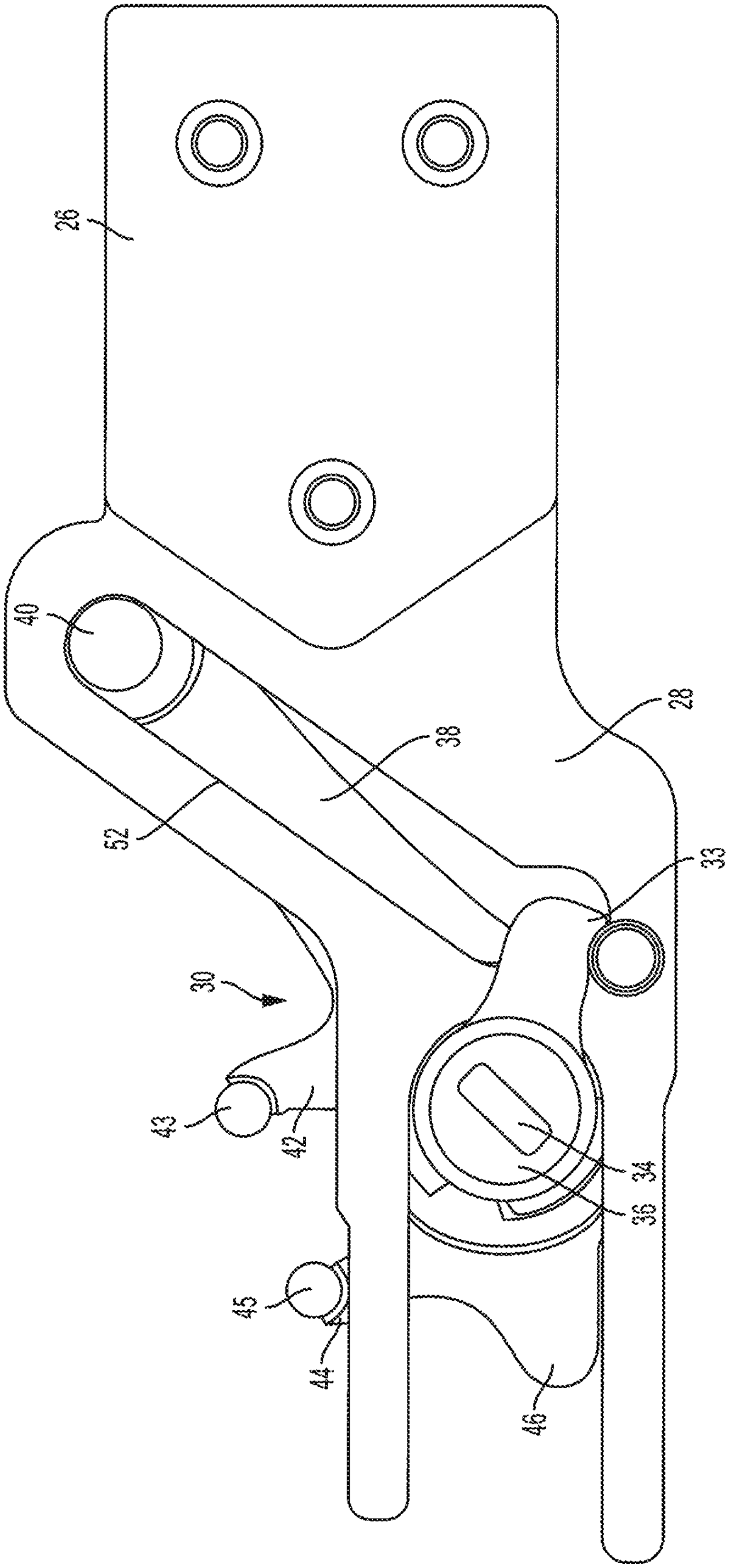
FIGS. 32 and 33 are opposite side elevational views of the hub core and deadbolt arm, positioned in the classroom function of operation, with the deadbolt bracket still retracted after the inside thumbscrew control member has rotated the hub core to attempt to project the deadbolt.
Figure 33:
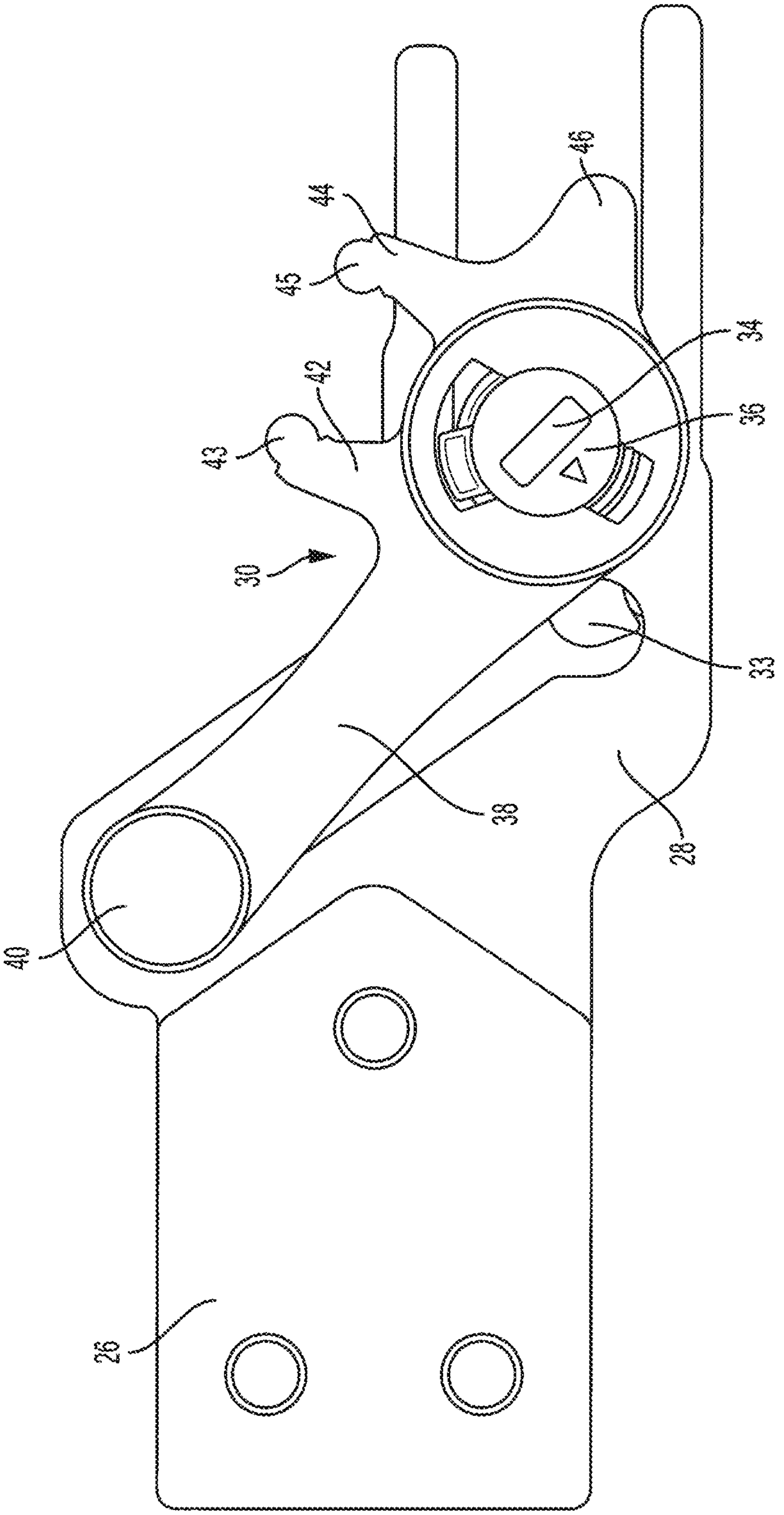
Figure 34:
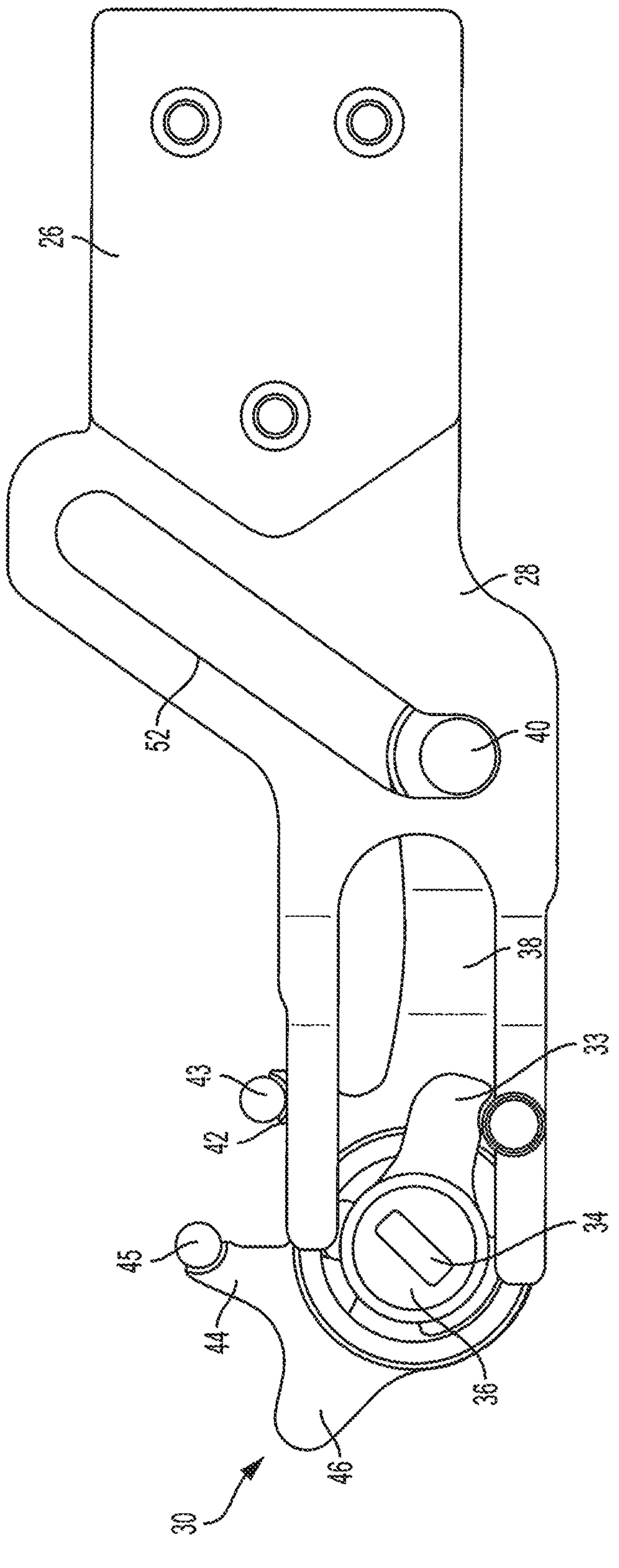
FIGS. 34 and 35 are opposite side elevational views of the hub core and deadbolt arm, positioned in the classroom function of operation, projecting the deadbolt bracket after the outside lock cylinder control member has rotated the deadbolt arm to project the deadbolt.
Figure 35:
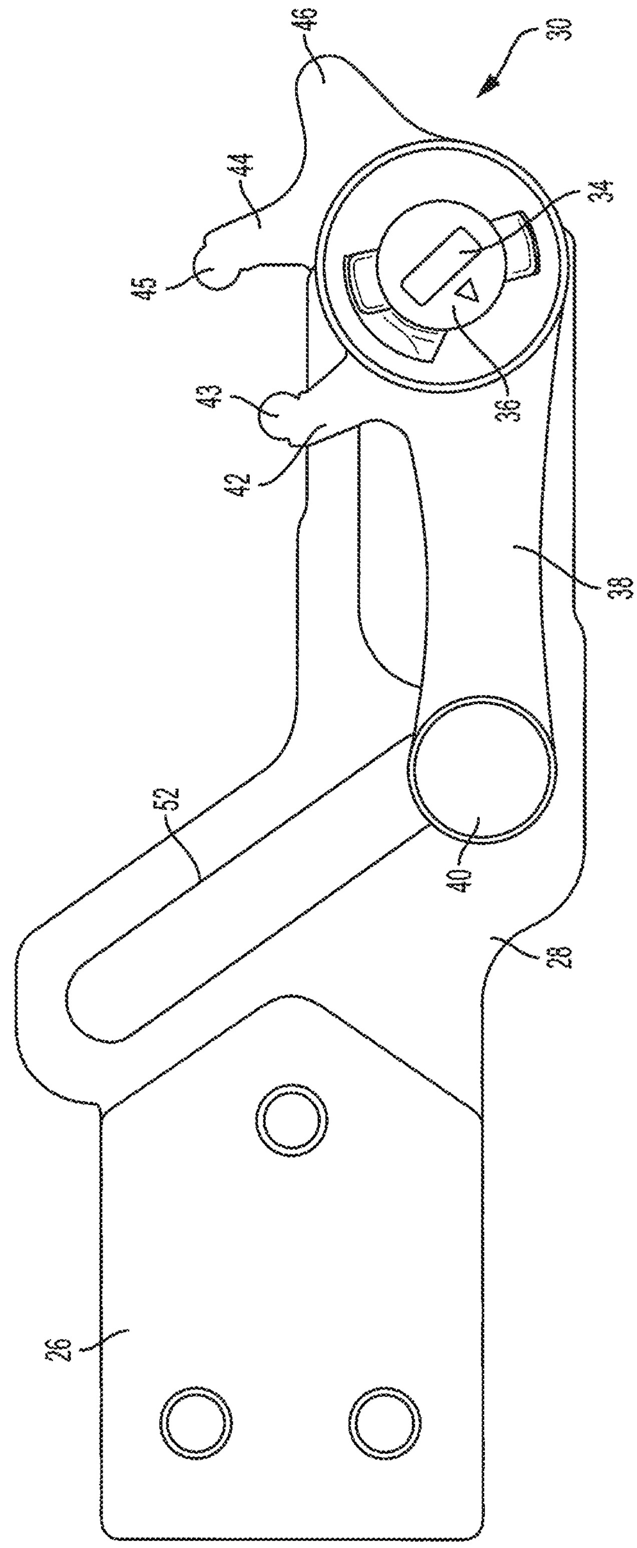

The operation of the hub core 36 within the opening of the deadbolt arm 30 for the classroom function of operation of the deadbolt is shown in FIGS. 26-35. In FIGS. 26 and 27 the inside thumbscrew control member has rotated hub core 36 within deadbolt arm hub portion 39 in one direction to unlock the deadbolt, and deadbolt bracket 28 in the resulting retracted position is shown in FIGS. 28 and 29. When the inside thumbscrew control member has rotated hub core 36 in the opposite direction to attempt to lock the deadbolt, as shown in FIGS. 30-33, hub projections 35*a*, 35*b* slide to the opposite ends within deadbolt hub portion slots 47*a*, 47*b* as the huh core 36 rotates in loss or lost motion. This has no effect on the rotation or position of deadbolt arm 30, so deadbolt bracket 28 remains in the retracted position as shown in FIGS. 32 and 33. On the other hand, the outside lock cylinder control member may still operate to rotate and move deadbolt arm 30 via fingers 42, 44 to lock the deadbolt 26, as shown in FIGS. 34 and 35 where the deadbolt bracket 28 has been projected. Because deadbolt arm 30 has rotated while hub core 36 has not, projections 35*a*, 35*b* slide to the ends within deadbolt hub portion slots 47*a*, 47*b* as shown previously in FIGS. 26-29, and are now in position to permit the inner thumbturn control member to rotate hub core 36 and cause the deadbolt to retract.

To change the lock from one function to the other, hub core 36 is removed from deadbolt arm 30 by withdrawing it in the direction of axis 50, rotating it 180° about the axis 50, and then reinserting the hub core into the deadbolt arm opening 41. Consequently, during assembly the huh core of the present invention can be oriented in one position before insertion in the deadbolt arm opening to operate as a standard function, or rotated or flipped to the opposite position and inserted to operate as a classroom function. Alternatively, after assembly, mortise lock sidewall 16*a* or 16*b* can be removed, and the hub core 36 which has been positioned to operate as one function can be removed and then rotated or flipped, and then reinserted to operate as the other function. These different configurations use the aforedescribed keying feature in the mating parts which changes the function depending on the orientation.

One advantage of the present invention is that both functions can be created by use of a single hub core piece, rather than having a separate standard function hub core and a classroom function hub core, as in the prior art. The ability to switch between functions can easily be completed during assembly, while the side of the lock is open. If the function is needed to be switched at a later time, the lock can be opened, and the hub core flipped 180°. One needs to create and stock only one hub core component, rather than two individual pieces. There is also the ability to easily switch between functions if necessary during assembly.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, What is claimed is:

1. A mortise lock for locking and unlocking a door comprising:

a mortise lock body having a deadbolt operable by a first control member on an outside of the door and a second control member on an inside of the door, the deadbolt being selectably moveable between a projected position to lock the door and a retracted position to unlock the door;

a deadbolt arm in the mortise lock body rotatable to move the deadbolt between the projected position and the retracted position; and a hub core disposed in the deadbolt arm, said hub core connected to and operable by the second control member, the hub core being positionable in the deadbolt arm in two different positions:

in a first position, the hub core being operable by the second control member to move the deadbolt between the projected position and the retracted position; and in a second position, the hub core being operable by the second control member to move the deadbolt from the projected position to the retracted position, the hub core not being operable by the second control member to move the deadbolt from the retracted position to the projected position.

2. The mortise lock of claim 1, wherein the first control member is operable to move the deadbolt between the projected position and the retracted position in either of the first position or the second position.

3. The mortise lock of claim 1, wherein the hub core has a plurality of projections with arc lengths that fit into a plurality of slots with arc lengths in an opening in the deadbolt arm, and wherein the hub core in the first position causes movement of the deadbolt in a standard function and the hub core in the second position causes movement of the deadbolt in a classroom function.

4. The mortise lock of claim 3, wherein the arc lengths of the plurality of projections and the plurality of slots are configured to permit the deadbolt arm to rotate and move the deadbolt in both the standard function and the classroom function.

5. The mortise lock of claim 3, wherein the arc lengths of the plurality of projections and the plurality of slots allow for a loss motion connection between the hub core and the plurality of slots when the hub core is in the second position.

6. The mortise lock of claim 1, wherein the hub core has a first projection having an arc length of about 90° and a second projection having an arc length of about 45° and the deadbolt arm has an opening with first slot having an arc length of about 90° and a second slot having an arc length of 135°, wherein in the first position the first projection is disposed in the first slot and the second projection is disposed in the second slot, and in the second position the first projection is disposed in the second slot and the second projection is disposed in the first slot.

7. The mortise lock of claim 6, wherein the first projection and the second projection have different thicknesses in an axial direction, with a thickness of the first projection being less than a thickness of the second projection.

8. A method of assembling a mortise lock for locking and unlocking a door comprising:

providing a mortise lock body having a deadbolt operable by a first control member on an outside of the door and a second control member on an inside of the door, the deadbolt being selectably moveable between a projected position to lock the door and a retracted position to unlock the door;

providing a deadbolt arm in the mortise lock body rotatable to move the deadbolt between the projected position and the retracted position;

providing a hub core operable by the second control member, the hub core being positionable in the deadbolt arm in two different positions; and assembling the hub core into the deadbolt arm in one of the two different positions:

in a first position, the hub core being operable by the second control member to rotate the deadbolt arm to move the deadbolt between the projected position and the retracted position; and in a second position, the hub core being operable by the second control member to rotate the deadbolt arm to move the deadbolt from the projected position to the retracted position, the hub core not being operable by the second control member to move the deadbolt from the retracted position to the projected position.

9. The method of claim 8, wherein the first control member is operable to move the deadbolt between the projected position and the retracted position in either of the first position or the second position.

10. The method of claim 8, wherein the hub core has a plurality of projections with arc lengths that fit into a plurality of slots with arc lengths in an opening in the deadbolt arm, and wherein the hub core in the first position causes movement of the deadbolt in a standard function and the hub core in the second position causes movement of the deadbolt in a classroom function.

11. The method of claim 10, wherein the arc lengths of the plurality of projections and the plurality of slots are configured to permit the deadbolt arm to rotate and move the deadbolt in both the standard function and the classroom function.

12. The method of claim 10, wherein the arc lengths of the plurality of projections and the plurality of slots allow for a loss motion connection between the hub core and the plurality of slots when the hub core is in the second position.

13. The method of claim 8, wherein the hub core has a first projection having an arc length of about 90° and a second projection has an arc length of about 45° and the deadbolt arm has an opening with a first slot having an arc length of about 90° and a second slot has an arc length of about 135°, wherein in the first position the first projection is disposed in the first slot and the second projection is disposed in the second slot, and in the second position the first projection is disposed in the second slot and the second projection is disposed in the first slot.

14. The method of claim 13, wherein the first projection and the second projection have different thicknesses in an axial direction, with a thickness of the first projection being less than a thickness of the second projection.

15. A mortise lock for locking and unlocking a door comprising:

a mortise lock body having a deadbolt operable by a first control member on an outside of the door and a second control member on an inside of the door, the deadbolt being selectably moveable between a projected position to lock the door and a retracted position to unlock the door; and a hub core disposed in the mortise lock body, the hub core operatively coupled to the deadbolt, the hub core being selectively rotatable by the second control member, said hub core operatively connected to the second control member, the hub core being positionable in the mortise lock body in two different positions:

in a first position, the hub core being operable by the second control member to move the deadbolt between the projected position and the retracted position; and in a second position, the hub core being operable by the second control member to move the deadbolt from the projected position to the retracted position, the hub core not being operable by the second control member to move the deadbolt from the retracted position to the projected position;

wherein the hub core is rotatable between the first position and the second position.

16. The mortise lock of claim 15, further comprising a deadbolt arm in the mortise lock body rotatable to move the deadbolt between the projected position and the retracted position, wherein the hub core is disposed in the deadbolt arm.

17. The mortise lock of claim 16, wherein the hub core has a plurality of projections with arc lengths that fit into a plurality of slots with arc lengths in an opening in the deadbolt arm, and wherein the hub core in the first position causes movement of the deadbolt in a standard function and the hub core in the second position causes movement of the deadbolt in a classroom function.

18. The mortise lock of claim 17, wherein the arc lengths of the plurality of projections and the plurality of slots allow for a loss motion connection between the hub core and the plurality of slots when the hub core is in the second position.

19. A mortise lock for locking and unlocking a door comprising:

a mortise lock body having a deadbolt operable by a first control member on an outside of the door and a second control member on an inside of the door, the deadbolt being selectably moveable between a projected position to lock the door and a retracted position to unlock the door;

a deadbolt arm in the mortise lock body rotatable to move the deadbolt between the projected position and the retracted position; and a hub core disposed in the deadbolt arm, the hub core operatively coupled to the deadbolt, the hub core being selectively rotatable by the second control member, said hub core operatively connected to the second control member, the hub core being positionable in the deadbolt arm in two positions, the hub core having a pair of projections with arc lengths that fit into a pair of slots with arc lengths in an opening in the deadbolt arm, and wherein one hub core projection fits rotationally tightly into one slot in the opening in the deadbolt arm when the hub core is in a first position of the two positions, and wherein both hub core projections fit rotationally loosely into both slots in the opening in the deadbolt arm when the hub core is in a second position of the two positions.

20. The mortise lock of claim 19, wherein in the first position, the hub core is operable by the second control member to move the deadbolt between the projected position and the retracted position; and wherein in the second position, the hub core is operable by the second control member to move the deadbolt from the projected position to the retracted position, the hub core not being operable by the second control member to move the deadbolt from the retracted position to the projected position.

21. The mortise lock of claim 19, wherein the arc lengths of the pair of projections and the pair of slots allow for a loss motion connection between the hub core and the pair of slots when the hub core is in the second position.

22. The mortise lock of claim 1, wherein the hub core is disposed in an opening in the deadbolt arm.

23. The mortise lock of claim 22, wherein the opening in the deadbolt arm extends through the deadbolt arm.

24. The mortise lock of claim 22, wherein the deadbolt arm is configured to rotate about a lock axis to move the deadbolt between the projected position and the retracted position, and wherein the opening in the deadbolt arm extends along the lock axis.

25. The mortise lock of claim 1, wherein the deadbolt arm is fully disposed in the mortise lock body.

* * * * *